United States Patent

[11] 3,624,225

[72] Inventor Cynthia Hilda O'Callaghan
 Gerrards Cross, England
[21] Appl. No. 647,303
[22] Filed June 20, 1967
[45] Patented Nov. 30, 1971
[73] Assignee Glaxo Laboratories Limited
 Greenford, England
[32] Priority June 24, 1966
[33] Great Britain
[31] 28,522/66

[54] CEPHALOSPORIN COMPOSITIONS
 28 Claims, No Drawings
[52] U.S. Cl. .................................................... 424/246
[51] Int. Cl. .................................................... A61k 21/00
[50] Field of Search ........................................ 424/246;
 260/243 C

[56] References Cited
 UNITED STATES PATENTS
3,216,999 11/1965 Flynn ............................ 260/243 C
 FOREIGN PATENTS
1,030,630 12/1963 Great Britain ................. 260/243
1,028,563 12/1963 Great Britain ................. 260/243
982,252 5/1962 Great Britain ................. 260/243
951,481 10/1961 Great Britain ................. 260/243
953,696 12/1961 Great Britain ................. 260/243

OTHER REFERENCES

O' Callaghan, Cynthia et al., Antimicrobial Agents & Chemotherapy (1966) p. 337– 343

Sabath, L. D. et al. I, Nature, Vol. 204, pp. 1066– 1069 (1964)

Sabath, L. D. et al. II, Biochemical Journal, Vol. 96, pp. 739– 752 (1965)

Hamilton-Miller, J. M. T. et al., Nature, Vol. 208, pp. 235– 237 (1965)

Wick, Warren et al., Applied Microbiology, Vol. 12, pp. 248– 253 (1965)

Primary Examiner—Sam Rosen
Attorney—Bacon & Thomas

ABSTRACT: An antibiotic composition having as essential components (A) a broad spectrum cephalosporin antibiotic subject to degradation by a β-lactamase and (B) a cephalosporin antibiotic resistance to degradation by the β-lactamase whereby the broad spectrum antibiotic is protected against such degradation.

CEPHALOSPORIN COMPOSITIONS

This invention is concerned with improvements in or relating to antibiotics of the cephalosporin series, i.e., derivatives of 7-aminocephalosporanic acid.

The discovery of cephalosporin C and the subsequent isolation of its nucleus, 7-aminocephalosporanic acid, has led to the development of a number of derivatives of the latter having broad spectrum activity as antibacterial antibiotics. The most important of such derivatives to date is the substance known by the common name cephaloridine, although other cephalosporin compounds of lesser activity but still possessing broad spectrum activity are of interest.

Unfortunately, these broad spectrum cephalosporin antibiotics are not active against certain important gram negative organisms principally strains of *Aerobacter* and *Proteus* organisms. Investigations have shown that certain *Proteus* organisms, e.g. *Pr. vulgaris, Pr. rettgeri, Pr. morgani* and certain organisms of the "coliform" type e.g. of the genera *Aerobacter, Enterobacter, Klebsiella, Hafnia* and *Citrobacter* produce enzymes which open the four-membered lactam ring of the antibiotics and inactivate them. It will be appreciated that some bacteriologists describe *Enterobacter* organisms as being *Aerobacter* organisms. We have used the term "*Enterobacter*" to describe nonmotile organisms and "*Aerobacter*" to describe motile organisms (see "Manual for Identification of Medical Bacteria" Cowan and Steel, 1965, Cambridge University Press, England). Confirmation of this has been obtained by proton magnetic resonance and/or ultraviolet spectra measurements of the inactivated compounds. It would, therefore, appear that the antibiotics are unable to kill the organisms owing to the more rapid action of the β-lactamases on the antibiotics. This not only lessens the effective range of activity of the antibiotics but also reduces the efficiency of the antibiotics, when there is simultaneous infection by a sensitive organism and a β-lactamase producer.

As a result of our researches we have found that various cephalosporin antibiotics are substantially resistant to degradation by the above-mentioned β-lactamases although in general are of minor importance as antibiotics (having a narrow spectrum and/or low degree of activity). We have further found that selected members of such β-lactamase-resistant antibiotics when combined with the above-mentioned broad spectrum antibiotics protect the latter against β-lactamase degradation thereby rendering the broad spectrum antibiotic effective against such β-lactamase producing organisms. This enhances the spectrum and/or degree of activity of the broad spectrum antibiotics without detracting from two of their principal and highly important advantages, viz their relative inertness to staphylococcal pencillinase and their utility in treating penicillin hypersensitive patients. Surprisingly, the cephalosporin antibiotics which are considerably less susceptible to degradation by the β-lactamases are themselves largely inactive against the organisms responsible for the lactamases.

According to the present invention, therefore, there is provided an antibiotic composition comprising (A) a broad spectrum cephalosporin antibiotic subject to degradation by a β-lactamase produced by *Proteus morgani* and (B) a cephalosporin antibiotic resistant to degradation by said β-lactamase whereby said broad spectrum antibiotic is protected against such degradation and its spectrum and/or degree of activity thereby improved.

As to whether a β-lactamase-resistant cephalosporin antibiotic is suitable for use in the composition according to the invention may be simply determined by in vitro experiments as hereinafter described.

The term "broad spectrum antibiotic" is used herein in its generally accepted sense (see "The Pharmacological Basis of Therapeutics," Third Edition by Goodman and Gilman, The MacMillan Co. New York, U.S.A. page 1,173) to denote antibiotics which are effective against both gram positive and gram negative organisms, principally *S. aureus* (gram positive) and *E. coli* and *Pr. mirabilis* (gram negative).

Particularly effective β-lactamase-resistant antibiotics (B) are compounds of the formula:

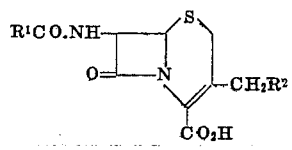

(I)

or a salt thereof with nontoxic cations, e.g. sodium or potassium, wherein $R^1$ is (i) a carbocyclic aromatic group (preferably a phenyl group) containing at least one substituent in an ortho position (ii) a 3-aryl-5-methyl-isoxazol-4-yl group or (iii) a 1,1-disubstituted aralkyl group, and $R^2$ is the acetate or the azide group.

The expression "ortho position" indicates a position in the group immediately adjacent to the point of attachment of the aromatic group to the carbonamido group of formula I.

Other compounds of formula I which may be used include those wherein $R^1$ is a 3-aryl-5-methyl-isoxazol-4-ylmethyl group, a 1-bromobutyl group, a 1-chloro-1-phenyl-methyl group, a 2-thienyl group, a 2-pyridyl group or a bis-(thien-2-yl)methyl group.

The invention includes within its scope as new compounds, compounds of the formula:

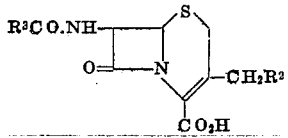

(II)

and salts thereof with nontoxic cations, e.g. sodium or potassium, wherein $R^3$ is 2-chlorophenyl, phenyl substituted with lower alkylthio in at least one ortho position, phenyl substituted with lower aralkylthio in at least one ortho position, 2,4,6-triloweralkylphenyl, 2,4,6-triloweralkoxyphenyl, 3-aryl-5-methyl-isoxazol-4-yl, 3-aryl-5-methyl-isoxazol-4-ylmethyl, where Z

is a bivalent hydrocarbon group, 1-acetoxy-1-phenylethyl, 1-chloro-1-phenylmethyl, or bis-(thien-2-yl)methyl, and $R^2$ is the acetate or azide group.

The term "lower" is used herein with reference to alkyl, aralkyl, alkylthio, aralkylthio and alkoxy indicates that the alkyl moiety of these groups contains 1–6, preferably 1–4, carbon atoms.

The cephalosporin antibiotic (A) is preferably a compound of the general formula

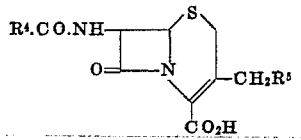

(III)

where $R^4$ is 2-thienylmethyl or D-α-amino-α-phenylmethyl and $R^5$ is acetate or, in betaine form with the adjacent carboxyl, $Py^+$ (where Py is N-pyridyl or substituted N-pyridyl e.g. nicotinamido or isonicotinamido). Examples of such antibiotics are described in British Pat. Nos. 1,028,563 and 1,030,630. It is particularly preferred to use the compound which forms the subject of British Pat. No. 1,028,563 which is known by the common name of cephaloridine and by the systematic name of N-7-(2'-thienylacetamidoceph-3-em-3-yl-methyl)-pyridinium-4-carboxylate, although it is to be specifically understood that the invention is not limited to the use of this preferred compound. Other compounds of this type which may be used include compounds of the formula

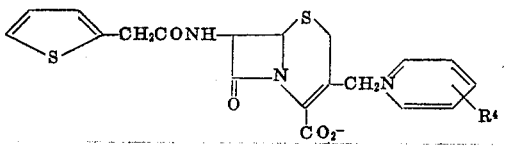

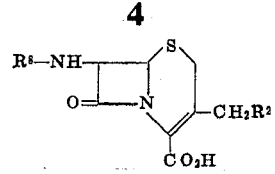

where $R^4$ is selected from carbamoyl, lower alkyl, hydroxy, hydroxymethyl, carboxy, carboalkoxy, lower alkylcarbamoyl, cyano, etc.

Other cephalosporin antibiotics (A) of formula III which may be used include cephalothin viz 3-acetoxymethyl-7-(2'-thienylacetamido)-ceph-3-em-4-carboxylic acid as the sodium or potassium salt and described and claimed in British Pat. No. 982,252; and 3-acetoxy- methyl-7-D-α-amino-α-phenylacetamidoceph-3-em-4-carboxylic acid ("cephaloglycin") described and claimed in British Pat. No. 985,747.

Where the group $R^1$ in the compound of formula I is an ortho-substituted phenyl group this may be a mono-ortho-substituted phenyl group wherein the ortho substituent is, for example, lower alkyl, lower aralkyl, lower alkylthio, lower aralkylthio, lower alkoxy or halogen e.g., chloro, bromo or iodo. However, the group $R^1$ preferably has the structure:

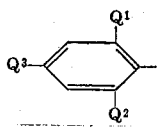

where $Q^1$ and $Q^2$, which may be the same or different are each lower alkyl, lower alkoxy or halogeno (e.g., chloro) and $Q^3$ is a hydrogen atom or has any of the meanings attributed to $Q^1$ and $Q^2$. Some of these compounds form the subject of British Pat. Nos. 951,481 and 953,696. The group $R^1$ may also be α-naphthyl and this compound ($R^2$ = acetate) is described in U.S. Pat. No. 3,216,999.

Where the group $R^3$ in formula II is a 3-aryl-5-methyl-isoxazol-4-yl or a 3-aryl-5-methyl-isoxazol-4-ylmethyl group, the aryl group may, for example, be phenyl or phenyl substituted with halogen, e.g. chlorine or bromine.

The 1,1-disubstituted aralkyl group may have the formula

where $R^5$ is an aromatic group, e.g. a phenyl group, and $R^6$ and $R^7$ are lower alkyl, lower alkoxy, lower alkanoyloxy, amino, substituted amino, hydroxy, lower alkylthio groups or together with the carbon to which they are attached form a carbocyclic or a heterocyclic group containing O, S or N. The group may thus be

where Ar is an aromatic group and Z is a bivalent hydrocarbon group e.g. the group—$(CH_2)_n$—, $n$ being 2, 3 or 4, or the group

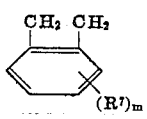

where $m$ is 0 or integer and $R^7$ is a lower alkyl etc. group.

The compounds of formulas I and II may be prepared by condensation of a compound of the formula:

or a salt thereof, wherein $R^8$ is a hydrogen atom or the group $R^1CO$ or $R^3CO$, and $R^2$ has the above-defined meaning with (1) where $R^8$ is a hydrogen atom, an acylating agent of the acid $R^1COOH$ or $R^3COOH$, as appropriate, followed by condensation of the resulting compound, if desired, with an alkali metal azide, if a compound wherein $R^2$ = azide is desired and a starting compound wherein $R^2$ = acetate is used;

(2) where $R^8$ is $R^1CO$ or $R^3CO$ and $R^2$ = acetate, an alkali metal azide to obtain a compound wherein $R^2$ = azide.

Acylating agents of the acid $R^1COOH$ and $R^3COOH$ may be any convenient acylating agent which yields the desired side chain e.g. the corresponding acid chloride or bromide, a mixed anhydride derived from the acid and an alkyl haloformate or the free acid in the presence of a carbodiimide. The acylation is conveniently carried out in an aqueous medium or an appropriate organic solvent and preferably in the presence of an acid binding agent.

The reaction with alkali metal azides may be effected as described in British Pat. No. 1,021,943.

Combinations of (A) and (B) which are particularly preferred are (1) cephaloridine and 3-acetoxymethyl-7-(2', 6'-dichlorobenzamido)-ceph-3-em-4-carboxylic acid (or the sodium or potassium salt thereof); (2) cephaloridine and 3-acetoxymethyl-7-(2', 4', 6'-trimethylbenzamido)-ceph-3-em-4-carboxylic acid (or the sodium or potassium salt thereof) (3) cephaloridine and 3-acetoxymethyl-7-(2', 6'-dimethoxybenzamido)-ceph-3-em-4-carboxylic acid (or the sodium or potassium salt thereof) and cephaloridine and 7-[3'-(2''-chlorophenyl)-5'-methylisoxazole-4'-carbon-amido-]ceph-3-em-4-carboxylic acid (or the sodium or potassium salt thereof), Compounds (A) and (B) may be used in a ratio by weight of from about 95:5 to about 5:95 correspondingly e.g. from 80:20 to 20:80. Preferably compounds (A) and (B) are used in a ratio by weight from about 2:1 to about 1:2 respectively, and conveniently about 1:1. It should be noted that even small amounts of compound (B) show a degree of protection for compound (A).

Compounds (A) and (B) may be formulated as a mixture for simultaneous administration. Thus, if compound (A) is normally administered parentally, as is the case with cephaloridine, then compounds (A) and (B) may be prepared as a dry mixture to which sterile pyrogen-free water may be added before use to form an aqueous solution of the desired concentration.

It is, however, not necessary to administer compounds (A) and (B) simultaneously and if desired they may be separately administered e.g. (A) followed by (B) or (B) followed by (A).

In general unit dosages of the compositions in human medicine on adults will range from 200 mg. to 1.5 g. or higher of compound (A) with a corresponding amount of compound (B) per dose, administered for example 2–5, conveniently 3 times a day.

In general the dosages and daily dose schedules will be determined in accordance with the infection being treated and the condition of the patient as is usual in antibiotic therapy. Larger doses than those referred to above may sometimes be required and may for example be given by intravenous drip.

Compositions for injection may be in powder form for reconstitution with a suitable vehicle, for example, sterile pyrogen-free water or may take such forms as solutions, suspensions or emulsions with aqueous or nonaqueous vehicles, and may contain carriers and excipients known in the art to assist formulation, such as suspending, stabilizing, dispersing, solubilizing and emulsifying agents. Examples of suitable vehicles include physiological saline, parenterally acceptable oils and oily esters such as arachis oil, isopropyl myristate, and water-miscible solvents such as propylene glycol.

The suspending agents may be, for example, sorbitol or carboxymethylcellulose for aqueous preparations, or aluminum stearate gel for oily vehicles. Suitable stabilizing agents include sequestering agents, such as sodium edetate; pH buffers, such as disodium hydrogen phosphate and sodium dihydrogen phosphate; antioxidants and preservatives such as sodium sulfite and sodium formaldehyde-sulfoxylate. Lecithin and polyethylene glycol—600 monoleate are examples of suitable dispersing agents. Parenterally acceptable emulsifying agents may be chosen from a wide range of surface-active agents to give either water-in-oil or oil-in-water emulsions, for instance, pentaerythritol dioleate, propylene glycol oleate, sorbitol monostearate, or colloidal materials such as acacia and gelatin.

The compositions, where appropriate, may be presented in a form suitable for absorption by the gastrointestinal tract. Tablets and capsules for oral administration may be in unit dose presentation form and may contain conventional excipients such as binding agents, for example, syrup, acacia, gelatin, sorbitol, tragacanth, or polyvinylpyrollidone; fillers, for example, lactose, sugar, maize-starch, calcium phosphate, sorbitol or glycine; lubricants, for example, magnesium stearate, talc, polyethylene glycol, silica; disintegrants, for example potato starch or acceptable wetting agents, such as sodium lauryl sulfate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethylcellulose, aluminum stearate gel or hydrogenated edible fats; emulsifying agents, for example, lecithin, sorbitan mono-oleate or acacia; nonaqueous vehicles which may include edible oils, for example almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

The composition may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semisolid form, or may be used as drops, etc. Topical applications may be formulated in hydrophobic or hydrophilic bases as ointments, creams, lotions, paints, powders etc.

For veterinary medicine, the compositions may, for example, be formulated as intramammary preparations (veterinary cerates) in either long-acting or quick-release bases.

The compositions of the invention for human or veterinary use may contain additional active ingredients e.g. other antibiotics.

The composition may be presented as a two container pack, one container containing compound (A) and the other containing compound (B).

We now give, by way of example only, methods of assaying susceptibility of broad spectrum cephalosporin antibiotics to $\beta$-lactamases and methods of selecting $\beta$-lactamase resistant cephalosporin antibiotic protectors.

Cells were removed from 48 hr. cultures by centrifuging, and resuspended in fresh nutrient broth to one-tenth original volume, containing about $10^{10}$ viable cells. The suspensions were diluted with nutrient broth in a doubling series, and to each dilution an equal volume of antibiotic substrate was added, so that each tube contained 4 ml. suspension and 250 $\mu$g./ml. substrate. The tubes were incubated at 37° C. for 2 hr. and the residual antibiotic was estimated by large (12×12) plate bio-assay. From the tube having the nearest amount to 125 $\mu$g./ml. of remaining substrate (i.e., 500 inactivation), the cell dilution required to destroy 125 $\mu$g./ml. in 2 hr. was calculated. To facilitate comparison between the activities of several organisms against one substrate, or of one organism against several substrates, this cell dilution was multiplied by 125, and the results expressed as the theoretical amount of compound that 1 ml. of the original cell suspension would destroy in 2 hr. This method of assessing antibiotic inactivation was used as we wished to study living cells undergoing cell division at antibiotic concentrations low enough to be found in the body.

In the following table we give an in vitro assessment of the protection afforded to cephaloridine (87/4) from $\beta$-lactamase attack using various cephalosporin compounds (B) as protectors. The (B) compounds were tested for their sensitivity to $\beta$-lactamases produced by *Pr.morgani* NCTC 235 and *Enterobacter cloacae* P99, a virulent member of the Aerobacter subgroup A and previously known as *A.aerogenes*, isolated by Dr. P. C. Fleming of The Research Institute, The Hospital for Sick Children, Toronto, Canada. Cephaloridine was tested in

TABLE 1

| Compound B | | Resistance of B to— | | Protection of 87/4 by B against— | |
|---|---|---|---|---|---|
| R¹ | R² | P99 | NCTC235 | P99 | NCTC235 |
| o-Chlorophenyl | Acetate | 1,923 | Infinity | 41 | Infinity. |
| 2,6-dichlorophenyl | do | Infinity | do | 224–Infinity | Do. |
| 2,4,6-trimethylphenyl | do | do | do | 3,951 | Do. |
| Do | Azide | do | do | 29 | Do. |
| 2,6-dimethoxyphenyl | Acetate | do | do | 1,336–4,717 | Do. |
| Do | Azide | N.A.¹ | N.A.¹ | 209 | Do. |
| 2,4,6-trimethoxyphenyl | Acetate | Infinity | Infinity | 3,569 | Do. |
| o-Methylmercaptophenyl | do | 559 | do | 27 | Do. |
| o-Benzylmercaptophenyl | do | 1,665 | do | 21 | Do. |
| 3-phenyl-5-methylisoxazol-4-yl | do | 4,352 | do | 720 | Do. |
| Do | Azide | Infinity | do | 3,079 | Do. |
| 3-o-chlorophenyl-5-methyl-isoxazol-4-yl | Acetate | do | do | 24 | Do. |
| Do | Azide | do | do | 1,353 | Do. |
| 3-(o,o-dichlorophenyl)-5-mehtyl-isoxazol-4-yl | Acetate | do | do | 343 | Do. |
| Do | Azide | do | do | 61 | Do. |
| 3-o-chlorophenyl-5-methyl-isoxazol-4-yl-methyl | do | 498 | do | 8 | Do. |
| 3-(o,o-dichlorophenyl)-5-methyl-isoxazol-4-yl-methyl | Acetate | Infinity | do | Infinity | Do. |
| Do | Azide | do | do | 111 | Do. |
| 1-bromobutyl | Acetate | 898 | do | 67 | Do. |
| 1-chloro-1-phenyl-methyl | do | 346 | do | 50 | Do. |
| Phenyl | Azide | 471 | do | 546 | Do. |
| 2-thienyl | Acetate | 25 | 20.3 | 124 | Do. |
| 2-pyridyl | do | 316 | Infinity | 115 | Do. |
| Bis(thien-2-yl-methyl) | do | Infinity | do | 16 | Do. |
| 2-phenyl-1,3-dithian-2-yl | Azide | do | do | 214 | Do. |
| 2-phenyl-1,3-dithiolan-2-yl | do | do | do | 96 | Do. |
| 6′,7′-dimethyl-2-phenylbenz-(e)-1,3-dithiepen-2-yl | do | do | do | 34 | Do. |
| DL-1-acetoxy-1-phenylethyl | do | 480 | do | 12 | Do. |
| α-Naphthyl | Acetate | 1,723 | do | 57 | Do. |

¹ Not assayed.

parallel and the results are expressed as the amount of cephaloridine destroyed (expressed as µg. destroyed by 1 ml. of cell suspension or organism) divided by the amount of analogue destroyed. Following this, mixtures of 250 µg./ml. analogue and 250 µg./ml. cephaloridine were tested to determine whether the presence of the analogue could protect cephaloridine from destruction by the β-lactamases of the same organisms. In this case, the results are expressed as the amount of cephaloridine destroyed, divided by the amount of cephaloridine destroyed in the presence of the analogue. Thus the larger the number in the table, the more stable the test substance (S) is to the enzymes, and inf. implies total resistance. The (B) compounds are designated with respect to formula (I) above.

The bacterial action of cephaloridine alone and in combination with the anti β-lactamase compounds, against *E.cloacae* and *Pr. morgani* is shown in tables 2A and 2B. The tables show the amount of growth or percentage kill at various times when *E. cloacae* is exposed to 250 µg./ml. of the cephaloridine and the protecting substances separately, and when they are combined, at 125 µg./ml. each. Similar experiments were shown with *Pr. morgani*, although with compound (B) $R^1$=2,6-dichlorophenyl and 2,4,6-trimethoxyphenyl the concentrations used were 31 µg./ml. separately or 16 µg./ml. of each when combined with cephaloridine. The M.I.C. of cephaloridine against *Pr. morgani* NCTC 235 can vary between 500 µg./ml. and 62 µg./ml.

Table 3 shows a further series of results calculated on the same basis as Table but using different compounds.

The invention will now be illustrated by the following examples of pharmaceutical and veterinary compositions.

COMPOSITION 1

Medium/Long Acting Veterinary Cerate

| | | | |
|---|---|---|---|
| Cephaloridine | | | 100.0 mg. |
| Sodium 3-acetoxymethyl-7-(2',6'-dimethoxybenzamido)-ceph-3-em-4-carboxylate | | | 100.0 mg. |
| White Beeswax | 5.0% | to | 3.0 g. |
| Arachis Oil | 95.0% | | |

Method

1. Heat the beeswax and arachis oil together to give a solution and strain through a stainless steel mesh.
2. Heat to 150° C. with stirring.
3. Close the vessel to exclude micro-organisms and hold at 150° C. with stirring for 1 hr.
4. Cool rapidly with stirring to room temperature.
5. Place the antibiotics in a sterile mortar and grind down with a little vehicle to give a smooth paste.
6. Slowly add more base to weight while further working the product in the mortar.
7. The product is further refined with a Silverson (high

TABLE 2A

[The percentage of kill of cephaloridine alone and in combination with the anti β-lactamase compounds with *E. cloacae*]

| Compound B | | Concentration in µg./ml. of— | | Percentage kill at hours— | | |
|---|---|---|---|---|---|---|
| $R^1$ | $R^2$ | Cephaloridine | Protecting substance | 1 | 3 | 5 |
| 2,6-dimethoxyphenyl | Acetate | 250 | Nil | Grown×2.5 | Grown×40 | Grown×487. |
| | | Nil | 250 | Grown×5 | Grown×53 | Grown×307. |
| | | 125 | 125 | Nil | 41.596 | Grown×26. |
| 2,4,6-trimethylphenyl | do | 250 | Nil | Nil | Grown×19 | Grown×31. |
| | | Nil | 250 | Nil | Grown×4 | Grown×37. |
| | | 125 | 125 | 85.611 | 99.907 | 99.984. |
| 2,6-dichlorophenyl | do | 250 | Nil | Nil | Grown×17 | Grown×1,164. |
| | | Nil | 250 | Grown×4 | Grown×84 | V.g.[1] |
| | | 125 | 125 | 60.98 | 100 | 100. |
| 2,4,6-trimethoxyphenyl | do | 250 | Nil | 6.2 | Grown×6 | Grown×81. |
| | | Nil | 250 | Nil | Grown×30 | Grown×839. |
| | | 125 | 125 | 76.843 | 99.875 | 97.846. |

[1] V.g.=visibly grown.

TABLE 2B

[The percentage kill of cephaloridine alone and in combination with the anti β-lactamase compounds with *Pr. morgani*]

| Compound B | | Concentration in µg./ml. of— | | Percentage kill at hours— | | | |
|---|---|---|---|---|---|---|---|
| $R^1$ | $R^2$ | Cephaloridine | Protecting substance | 1 | 3 | 5 | 24 |
| 2,6-dimethoxyphenyl | Acetate | 250 | Nil | Grown×3 | 94.143 | 99.950 | (¹) |
| | | Nil | 250 | Grown×4 | Nil | Grown×23 | (¹) |
| | | 125 | 125 | Grown×3 | 99.890 | 100 | 100 |
| 2,4,6-trimethylphenyl | do | 250 | Nil | Nil | 99.993 | 99.940 | (¹) |
| | | Nil | 250 | Grown×3 | 56.89 | 81.26 | (¹) |
| | | 125 | 125 | Nil | 99.992 | 99.979 | 100 |
| 2,6-dichlorophenyl | do | 31 | Nil | 13.69 | 62.302 | 25.794 | (¹) |
| | | Nil | 31 | Nil | 66.992 | Grown×7 | (¹) |
| | | 16 | 16 | Nil | 17.56 | 93.817 | 100 |
| 2,4,6-trimethoxyphenyl | do | 31 | Nil | 13.69 | 62.302 | 25.794 | |
| | | Nil | 31 | Nil | 60.988 | Grown×3 | |
| | | 16 | 16 | Nil | 53.939 | 99.930 | |

[1] Visibly grown.

TABLE 3

| | Compound B | | Enzyme source | | | |
|---|---|---|---|---|---|---|
| | | | P99 | | NCTC 235 | |
| Compound A | $R^1$ | $R^2$ | Amount destroyed | A/B | Amount destroyed | A/B |
| Cephalothin | | | 360,400 | | 110,600 | |
| Do | 2,4,6-trimethylphenyl | Acetate | 2,400 | 150 | 120 | 922 |
| Do | 2,6-dichlorophenyl | do | 5,200 | 69 | Nil | Infinity |
| Cephaloglycin | | | 21,200 | | 8,300 | |
| Do | 2,4,6-trimethylphenyl | Acetate | 700 | 30 | Nil | Infinity |
| Do | 2,6-dichlorophenyl | do | ¹ | | Nil | Infinity |
| N-7-(2'-thienylacetamido-ceph-3-em-3-ylmethyl-3''-carbamoylpyridinium-4-carboxylate. | 2,6-dimethoxyphenyl | do | | | 267 | Infinity |
| 4''-carbamoyl analogue of previous compound. | do | do | | | 190 | Infinity |

[1] No assay.

shear) stirrer and finally passed through a stainless steel-faced colloid mill before aseptically filling into sterile tubes.

COMPOSITION 2

Quick Release Veterinary Cerate

| | | | |
|---|---|---|---|
| Cephaloridine | | 100.0 mg. | |
| Sodium 3-acetoxymethyl-7-(2',6'-dimethoxybenzamido)-ceph-3-em-4-carboxylate | | 100.0 mg. | |
| Tween 80 | 2.75% | to | 3.0 g. |
| White Beeswax | 5.00% | | |
| Arachis Oil | 92.25% | | |

Method
1. Heat the beeswax and arachis oil together to give a solution and strain through a stainless steel mesh.
2. Add the Tween 80.
3. Close the vessel to exclude micro-organisms and hold at 150° C. with stirring for 1 hr.
4. Cool rapidly with stirring to room temperature.
5. Then process as for Composition 1.

COMPOSITION 3

Injection

| | |
|---|---|
| A sterile dry powder mixture of Cephaloridine | 500.0 mg. |
| Sodium 3-acetoxymethyl-7-(2',6'-dimethoxybenzamido)-ceph-3-em-4-carboxylate | 500.0 mg. | to which 2.0 ml. of sterile water is to be added before injection.

Method
1. Weigh the two antibiotics into a sterile blender.
2. Blend.
3. Fill aseptically into sterile vials.

There will now be described the preparation of new compounds according to the invention.

These examples are given by way of illustration only.

Unless otherwise stated ultraviolet spectra are for solutions in 0.1 M phosphate buffer at pH 6.0; m.pts. were determined on a Kofler hot-stage microscope and optical rotations are for ca. 1 percent solutions in dioxan.

EXAMPLE 1

3-Acetoxymethyl-7-(5'-methyl-3'-phenylisoxazole-4'-carbonamido)-ceph-3-em-4-carboxylic acid Ethyl-5-methyl-3-phenylisoxazole-4-carboxylate (prepared from α-chlorobenzaldoxime) was saponified to give 5-methyl-3-phenylisoxazone-4-carboxylic acid as colorless crystals m.p. 190°–191° from ethanol.

5-Methyl-3-phenylisoxazole-4-carboxylic acid (3.75 g. 18.5 m. mole) was boiled under reflux with excess thionyl chloride (25 ml.) for 2 hr. and the thionyl chloride boiled off under reduced pressure to leave the acid chloride as an oil. This oil was dissolved in dry acetone (25 ml.) and added to a cooled (0°), stirred solution of 3-acetoxymethyl-7-aminoceph-3-em-4-carboxylic acid (5.0 g. 18.4 m. mole), sodium bicarbonate (3.75 g. 45 m. mole), acetone (50 ml.) and water (75 ml); stirring and cooling were continued for 1 hr., after which the reaction was allowed to warm to ambient temperature over 1 hr. On completion, the acetone was removed under reduced pressure and the aqueous residue washed with diethyl ether (2×50 ml.), acidified to pH 1.5 and extracted with ethyl acetate (2×75 ml.). The bulked ethyl acetate extract was washed with water, dried and distilled to dryness under reduced pressure to leave a solid (6.0 g.) which was reprecipitated from acetone/b.p. 60°–80° petroleum to give 3-acetoxy-methyl-7-(5'-methyl-3'-phenylisoxazole-4'-carbonamido)-ceph-3-em-4-carboxylic acid. Yield 5.8 g. (69.1 percent). $R_f$ Butanol system=0.73.

EXAMPLE 2

3-Azidomethyl-7-(5'-methyl-3'-phenylisoxazole-4'-carbonamido)-ceph-3-em-4-carboxylic acid 3-Acetoxymethyl-7-(5'-methyl-3'-phenylisoxazole-4'-carbonamido)-ceph-3-em-4-carboxylic acid (1.0 g. 2.2 m. mole) was dissolved in water (25 ml.) and sodium bicarbonate (0.184 g. 2.2 m. mole); the carbon dioxide was removed under reduced pressure, sodium azide (0.29 g. 4.4 m.mole) added and the solution heated in a closed flask at 50° for 17 hr. The reaction mixture was cooled, washed with ethyl acetate (3×20 ml.), acidified to pH 1.5 and extracted with ethyl acetate (3×25 ml.); the bulked extract was washed with water, dried and distilled to dryness under reduced pressure. The resultant glass was dissolved in ethyl acetate (50 ml.) and subjected to a diamond pattern separation using pH 5 phosphate buffer and ethyl acetate to give 3-azidomethyl-7-(5'-methyl-3'-phenylisoxazole-4'-carbonamido)-ceph-3-em-4-carboxylic acid. Yield 0.31 g. (31.5 percent). λ230 nm. max $E_{1cm.}^{1\%}$ =430. λ260 nm. inf. $E_{1cm.}^{1\%}$=250. $R_f$ ethyl acetate system=0.23, $R_f$ butanol system=0.81.

EXAMPLE 3

Sodium 3-acetoxymethyl-7-[3'-(2''-chlorophenyl)-5'-methylisoxazole-4'-carbonamido]-ceph-3-em-4-carboxylate 3-(2'-Chlorophenyl)-5-methylisoxazole-4-ylcarbonyl chloride (6.1 g., 24 m.moles) was dissolved in actone (40 ml.) and a portion (30 ml.) of this solution was added to a stirred solution of 3-acetoxymethyl-7-aminoceph-3-em-4-carboxylic acid (5.44 g., 20 m.moles) in water (200 ml.) and acetone (200 ml.) containing sodium hydrogen carbonate (4.2 g., 50 m.moles). After 15 min. the remainder of the acid chloride solution was added, and the reaction mixture was stirred for a further 30 min. The acetone was removed by evaporation at 30° and the aqueous layer was twice extracted into ethyl acetate. The resulting aqueous solution was acidified with 2N-hydrochloric acid and extracted three times with ethyl acetate (100 ml.). The combined washed and dried extracts were evaporated to give a yellow foam (9.6 g.). This product in ethyl acetate (100 ml.) was treated with a 10 percent solution of sodium 2-ethyl-hexanoate in butan-1-ol (50 ml.) to give the title compound (8.9 g.), $[\alpha]_D+62°$(c 0.88 in $H_2O$), λmax. (pH 6.0 phosphate buffer) 260 nm. (ε9000). A sample crystallized from acetone-ether water was analyzed (Found: C, 47.8; H, 3.7; Cl, 6.6; N, 7.7; S, 6.1 $C_{21}H_{17}ClNaN_3O_7S.H_2O$ requires C,47.4; H, 3.6; Cl, 6.7; N, 7.9; S, 6.0%).

EXAMPLE 4

Sodium 3-azidomethyl-7-[3'-(2''-chlorophenyl)-5'-methylisoxazole-4'-carbonamido]ceph-3-em-4-carboxylate Replacement of the acetoxy group in sodium 3-acetoxymethyl 7-[3'-(2''-chlorophenyl)-5'-methylisoxazole-4'-carbonamido]ceph-3-em-4-carboxylate (example 3) by treating an aqueous solution with sodium azide as described in Pat. No. 1,012,943 gave sodium 3-azidomethyl-7-[3'-(2''-chlorophenyl)-5'-methylisoxazole-4'-carbonamido]- ceph-3-em-4-carboxylate, λ max 260 nm. (ε 7,300), νmax. (Nujol) 2,110 ($N_3$), 1,760 (β-lactam), 1,660, 1,518 (CONH), 1,610 cm.$^{-1}$ ($CO_2^-$)

EXAMPLES 5 and 6

Sodium 3-acetoxymethyl 7-[3'-(2'', 6''-dichlorophenyl)-5'-methylisoxazole-4'-carbonamido]-ceph-3-em-4-carboxylate and sodium 3-azidomethyl-7-[3'-(2'', 6''-dichlorophenyl)-5'-methylisoxazole-4'-carbonamido]ceph-3-em-4 carboxylate In a similar manner to example 3 but starting from 3-(2', 6'-dichlorophenyl)-5-methylisoxazol-4yl carbonyl chloride and (A) 3-acetoxymethyl-7-amino-ceph-3-em-4-carboxylic acid and (B) 7-amino-3-azidomethylceph-3-em-4-carboxylic acid, there were obtained (A) sodium 3-acetoxymethyl 7-[3'-(2''', 6''-dichlorophenyl)-5'-methylisoxazole-4'-carbonamido]-ceph-3-em-4-carboxylate, $[\alpha]_D+76°$ (c 1.0 in $H_2O$), λ max. (pH 6.0 phosphate buffer) 260 nm. (ε8450) (Found: C, 45.6;

H, 3.1; Cl, 12.9; N, 7.2; S, 5.4, $C_{21}H_{16}Cl_2 NaN_3O_7S$ requires C, 46.0; H, 2.9; Cl, 12.9; N, 7.7; S, 5.8 percent) and (B) sodium 3-azidomethyl-7-[3', 6''-dichlorophenyl)-5'-methylisoxazole-4'-carbon-amido]-ceph-3-em-4-carboxylate $[\alpha]_D$+ 73.5 (c 1.02 in $H_2O$), λ max. (pH 6.0 phosphate buffer) 260 nm. (ϵ 9,300). (Found: C, 39.6; H, 2.5; Cl, 12.3; N, 14.8; S, 6.2. $C_{19}H_{13}Cl_2NaN_6O_5S$, $2H_2O$ requires C, 40.2; H, 3.0; Cl, 12.5; N, 14.8; S, 5.7%).

EXAMPLE 7

3-Acetoxymethyl-7-(5'-methyl-3'-phenylisoxazol-4'-yl-acetamido)ceph-3-em-4-carboxylic acid a. 4-Diazomethylcarbonyl-5-methyl-3-phenylisoxazole 5-Methyl-3-phenylisoxazole-4-carboxylic acid (10.16 g., 50 m.moles) was heated under reflux in thionyl chloride (90 ml.) for 2 hr. Excess thionyl chloride was removed in vacuo to give 5-methyl-3-phenylisoxazole-4-carbonyl chloride (9.2 g., 84 percent) as a pale yellow solid melting at ca. room temperature.

The acid chloride (2.37 g., 10.8 m.moles) in dioxan (25 ml.) was slowly added to a solution of ethereal diazomethane (37.5 m.moles, prepared from nitrosomethylurea and assayed by reaction with an excess of p-nitrobenzoic acid) cooled to 0°–2°. The addition took 2 hr. after which the solution was allowed to warm to room temperature overnight. Excess diazomethane was still present. The reaction mixture was evaporated at 25° to give a pale yellow oil which was dissolved in ether and precipitated with light petroleum (b.p. 40°–60°) as a pale yellow solid diazoketone (1.07 g., 44 percent), m.p. 57°–58 (decomp.) $\lambda_{max.}$ (in ethanol) 227 (ϵ13,050) and 287 nm (ϵ10,000), $\nu_{max.}$ (CHBr$_3$) at 2,120 (CHN$_2$), 1,620 (ArCO) and 780, 768 cm.$^{-1}$ (Ph), p.m.r. (CDCl$_3$) peaks at 2.48 (Ph), 4.98 (CH) and 7.28 τ(CH$_3$).

b. 5-Methyl-3-phenylisoxazole-4-ylacetic acid i. Direct method by Wolff rearrangement of the diazoketone under aqueous conditions The diazoketone (4.88 g., 21.5 m.mole, total crude oil) was dissolved in dioxan (35 ml.) and slowly added to a warm (60°–70°) suspension of silver oxide (0.63 g.) in water (50 ml.) containing sodium thiosulphate (0.94 g., 6 m.moles) and sodium carbonate (1.58 g., 14.8 m.moles). The mixture was kept at 70° with stirring for 1 hr. when the temperature was raised to 100° for 0.5hr. The mixture was cooled, diluted with water (100 ml.), acidified with 2N-nitric acid and extracted into ethyl acetate (4×75 ml.). The organic layer was filtered through kieselguhr, washed twice with water and then with a saturated solution of sodium hydrogen carbonate (75 ml.) Most of the color remained in the ethyl acetate layer which was twice washed with water. The combined aqueous layers were acidified with 2N-hydrochloric acid to give a white precipitate which was extracted into ethyl acetate (3×75 ml.). The washed and dried organic layer was evaporated to a yellow gum (3.6 g., 81 percent).

Attempts to crystalize the gum failed but on standing for Ca. 3 weeks some solidification occurred and recrystallization from ethyl acetate petroleum ether (b.p. 40°–60°) gave prisms, m.p. 79°–81°, $\lambda_{max.}$ 230–232 nm (ϵ 10,500), p.m.r. showed peaks at—0.32 (CO$_2$H), 2.54 (Ph), 6.54 (CH$_2$) and 7.59 τ(CH$_3$). (Found, for a sample after melting and resolidification: C, 65.9; H, 5.3; N, 6.5. $C_{12}H_{11}NO_3$ requires C, 66.3; H, 5.1; 6.45%).

ii. Via the ethyl ester

The diazoketone (21.6 g., solvated, containing Ca. 80 m.moles) was dissolved in dry ethanol (900ml.) and warmed to 70°. Part of a suspension of freshly prepared silver oxide (20 m.moles) in ethanol (10 ml.) was added in portions ca. 0.5 ml.) over a period of 2.5 hr. at which time the ultraviolet spectrum of a suitably diluted sample of the reaction mixture indicated the absence of the diazoketone (no maximum at 288 nm). The black suspension was clarified by filtration through kieselguhr; the orange filtrate was evaporated to an orange oil. A solution of this oil in ethyl acetate (200 ml.) was washed successively with saturated sodium hydrogen carbonate (3×100 ml.), water (2×100 ml.) brine (100 ml.) dried and evaporated to an oil (20.4 g.). Distillation at 1 mm. Hg. gave the ethyl ester in two fractions (6.4 g.), b.p. 170°–182° and (8.0 g.), b.p. 184°, p.m.r. (CDCl$_3$) peaks at 2.42 (Ph), 5.86 and 8.81 (CH$_2$CH$_3$), 6.53 (CH$_2$) and 7.53 τ(CH$_3$).

This ester (14.3 g., 58 m.moles) was saponified by treating an ethanolic solution (120 ml.) with potassium hydroxide (6.0 g.) in water (20 ml.) at room temperature for 1.5 hr. Evaporation of the deep wine colored solution gave a red-brown oil which was shaken with water (100 ml.) and washed with ether (4×100 ml.). The aqueous layer was covered with ethyl acetate (100 ml.) and the pH of the mixture was dropped to 2 with concentrated hydrochloric acid. The aqueous layer was further extracted with ethyl acetate (3×100 ml.). The combined organic extracts were back-washed with water and brine, dried and evaporated to give a yellow oil which solidified (12 g.) when seeded with a trace of the required acid obtained as described above. Crystallization from ethyl acetate—40°–60° petroleum spirit gave 5-methyl-3-phenylisoxazol-4-ylacetic acid (7.1 g., 56 percent), m.p. 82°, $\lambda_{max.}$ 234 nm (ϵ 10,500) (Found: C, 66.6; 66.3; H, 5.4, 5.1; N, 6.1, 6.3. $C_{12}H_{11}NO_3$ requires C, 66.3; H, 5.1; N, 6.45%). Concentration of the mother liquors gave a second crop (2.2 g.) of less pure material.

c. 3-Acetoxymethyl-7-(5'-methyl-3-phenylisoxazol-4'-yl-acetamido)ceph-3-em-4-carboxylic acid The acid from (b) (2.8 g., 12.8 m.moles) was heated under reflux in thionyl chloride (25 ml.) for 1 hr. Excess reagent was removed by evaporation to give the acid chloride as a reddish oil (2.94 g.).

The acid chloride (assumed to be 12.5 m.moles) was dissolved in dry acetone (20 ml.). A portion (15 ml.) of this solution was added dropwise to a cooled (10°) solution of 7-aminocephalosporanic acid (2.72 g., 10 m.moles) in a mixture of acetone (100 ml.) and water (100 ml.) containing sodium hydrogen carbonate (2.1 g., 25 m.moles). After the addition was complete the reaction mixture was stirred for 15 min. and the remainder of the acid chloride solution (5 ml.) was added. The reaction mixture was removed from the cooling bath and allowed to stir at room temperature for 20 min. The pH (5.2) was adjusted to 7.0 and twice extracted with ethyl acetate to remove neutral products. The aqueous layer was covered with ethyl acetate (150 ml.) and acidified with 2N-hydrochloric acid; further extraction with ethyl acetate (2×100 ml.) was carried out. The combined extracts were washed with water, dried and evaporated to a solid (2.42 g., 51 percent) which was recrystallized from ethyl acetate to give the title compound (1.09 g., 23 percent), m.p. 158°–160°, $[\alpha]_D$+66° (c, 0.66 dioxan), $\lambda_{max.}$ 236 (ϵ15,600) and λ260 nm (ϵ9,900), (Found for a sample dried at 40° in vacuo: C, 55.9; H, 4.8; N, 8.5; S, 6.5. $C_{22}H_{21}N_3O_7$ S requires C, 56.0; H, 4.5; N, 8.9; S, 6.8%). A second crop (0.2 g.), m.p. 161°–163°was obtained by concentrating the mother liquors.

EXAMPLE 8

3-Azidomethyl-7-(5'-methyl-3'-phenylisoxazol-4'-yl-acetamido)-ceph-3-em-4-carboxylic acid.

A solution of 7-amino-3-azidomethylceph-3-em-4- carboxylic acid (5.1 g., 20 m.moles) in acetone (150 ml.) and water (150 ml.) containing sodium hydrogen carbonate (4.2 g., 50 m.moles) was cooled to 10° and treated dropwise with a portion (9ml.) of a solution of the acid chloride (7.57 g., 25 m.moles) in acetone (12 ml.). After stirring for 15 min. the remainder of the acid chloride solution was added and the orange mixture was stirred at room temperature for 1 hr. The reaction mixture was worked up as described above to give the crude azide in three crops (3.7, 2.2 and 3.3 g., respectively) from ethyl acetate. These were treated separately with ether to remove residual side chain acid leaving a total of 6.4 g., 70 percent of the title compound, m.p. 180°, $[\alpha]_D$+75°, $\lambda_{max.}$ 235 nm (ϵ 15,750) and $\lambda_{inf.}$ 262 nm (ϵ 9,500), (Found: C, 52.6;

52.6; H, 4.0, 4.0; N, 18.8, 18.8; S, 6.8. $C_{20}H_{18}N_6O_5S$ requires C, 52.8; H, 4.0 ; N, 18.5; S, 7.05 percent).

EXAMPLE 9

3-Acetoxymethyl-7-[3'-(2''-chlorophenyl-5'-methylisoxazol-4'-yl-acetamido]ceph-3-em-4-carboxylic acid a. 3-(2'-Chlorophenyl)-4-diazomethylcarbonyl-5-methylisoxazole 3-(2'-Chlorophenyl)-5-methylisoxazol-4-yl-carbonyl chloride (6.96 g., 27.2 m.moles) is dioxan (50 ml.) was slowly added to a solution of diazomethane (0.1 mole) in ether (360 ml.) at −10° to −5°. The solution was allowed to warm to room temperature overnight. Evaporation left a solvated yellow oil (7.9 g.), $\lambda_{max.}$ 287 nm ($E_{1cm}$.406), $\nu_{max.\ (CHBr_3)}$ 2,118 ($N_2$). No attempt was made to purify this diazoketone.

b. 3-(2'-Chlorophenyl)-5-methylisoxazol-4-yl-acetic acid

The crude diazoketone (9.12 g., ca. 31.6 m.moles) was dissolved in warm, dry ethanol (200 ml.) and the yellow solution was heated to 70°. An ethanolic suspension of freshly prepared silver oxide (from 20 ml. 0.5N-sodium hydroxide and 20 ml. 0.5N-silver nitrate in water followed by centrifuging the silver oxide, washing with three portions of ethanol and suspending in 10 ml. dry ethanol) was added in ca. 0.5 ml. portions at 70°. Nitrogen evolution was noted after addition of the catalyst, this soon stopped and more catalyst was added at half hour intervals for 5 hr. then at hourly intervals up to 7 hr. with heating under reflux. During this reaction ultraviolet spectra were run on filtered and suitably diluted samples (1 ml.→100 ml.) of the reaction mixture; the absorption at 287 nm due to the diazoketone was reduced from 1.16 to 0.71 (optical density units). A sample of the reaction mixture evaporated and examined by infrared spectroscopy, showed both a diazoketone band (2,120 cm.$^{-1}$) and a new ester band (1,735 cm.$^{-1}$). Accordingly, the reaction mixture was retreated with frequent additions of fresh silver oxide under reflux until nitrogen was no longer evolved (3 hr.). Ultraviolet and infrared spectra of a sample of the reaction mixture showed only a trace of the diazoketone remaining. The bulk of the reaction mixture was filtered through kieselguhr, the orange filtrate was evaporated to dryness in vacuo. The resulting brown oil in ethyl acetate (50 ml.) was washed (2×30 ml.). The organic layer was dried and evaporated to give the ethyl ester as a brown oil which was dried in vacuo and used without further purification (8.02 g., 91 percent).

The crude ethyl ester (8 g., 28.8 m.moles) was dissolved in ethanol (60 ml.) and treated with a solution of potassium hydroxide (3 g., ca. 45 m.moles) in water (10 ml.) to give a deep-red solution which was kept at room temperature for 1.5 hr. The mixture was then evaporated and the red-brown oil was shaken with water (100 ml.) and ether (100 ml.). The aqueous layer was further extracted with ether (2×100 ml.); evaporation of the combined, dried ether extracts gave an orange-yellow oil (0.88 g.).

The aqueous layer was covered with ethyl acetate (100 ml.) and acidified to pH 1.5 with concentrated hydrochloric acid. The aqueous layer was further extracted with ethyl acetate (2×50 ml.). The deep-red extracts were combined, washed with water (2×30 ml.), dried and evaporated to a dark-brown gum. This material was purified by three successive triturations with petroleum (b.p. 40°–60°) (100 ml.) containing ether (10 percent v./v.) to give the title acid as a buff crystalline solid (4.54 g., 63 percent), m.p. 98°–99°, p.m.r. ($D_2O$ with sodium hydrogen carbonate) showed peaks at 2.50 (aromatic, 4H), 6.75 ($CH_2$) and 7.53 ($CH_3$) $\tau$ (Found: C, 56.8, 57.4; H, 4.0, 4.0; N, 5.1, 5.4; Cl, 14.1. $C_{12}H_{10}ClNO_3$ requires: C, 57.1; H, 4.0; N, 5.5; Cl, 14.1%). A second crop (0.63 g.). m.p. 98°, was obtained as blades from the ether-petroleum triturates.

c. 3-Acetoxymethyl-7-[3'-(2''-Chlorophenyl)-5'-methylisoxazol-4'-yl-acetamido]-3-em-4-carboxylic acid 3(2'-Chlorophenyl)-5-methylisoxazol-4-yl-acetic acid (2.2 g., 8.7 m.moles) was heated to reflux with thionyl chloride (25 ml.) for 1.5 hr. The solvent was evaporated and the resulting oil was kept at room temperature under high vacuum for 2 hr. The crude acid chloride (2.45 g.) was dissolved in acetone (3ml.). A portion (2.5 ml.) of this solution was added to a cooled (10°) and stirred solution of 7-aminocephalosporanic acid (1.9 g., 7 m.moles) in water (50 ml.) and acetone (50 ml.) and acetone (50 ml.) containing sodium hydrogen carbonate (1.47 g., 17.5 m.moles). The mixture was stirred for 15 min. when the remainder of the acid chloride was added. A solid was precipitated at this stage and the mixture was stirred for 1.75 hr. at room temperature. The pH (5.2) was adjusted to 7.0 with sodium hydrogen carbonate solution and the mixture was evaporated to remove acetone. Neutral products were extracted with ethyl acetate (3×50 ml.) and the aqueous layer was acidified with 2N-hydrochloric acid. Extraction into ethyl acetate (4×50 ml.) and evaporation of the washed and dried extracts yielded the crude product (3.88 g.), $\lambda_{inf.}$ 256 nm ($E^{1\%}_{1cm}$.157). Paper chromatography supported by infrared and p.m.r. evidence showed evidence of contamination with the starting acid. The crude product was heated under reflux with ether (200 ml.) for 15 min.; filtration gave a solid (2.8 g.) free of such contamination. Recrystallization from ethyl acetate gave the title acid (1.42 g., 40 percent), $[\alpha]_D$+46.5° $\lambda_{inf.}$ 257–260 nm ($\epsilon$ 8,600), (Found: C, 52.05, 52.2; H, 4.1, 4.15; Cl, 7.1; N, 7.8, 7.85; S, 6.2. $C_{22}H_{20}ClN_3O_7S$ requires: C, 52.2; H, 4.0; Cl, 7.0; N, 8.3; S, 6.3 percent).

EXAMPLE 10

3-Azidomethyl-7-[3'-(2-chlorophenyl)-5'-methyl-isoxazol-4'-yl-acetamido]ceph-3-em-4-carboxylic acid 7-Amino-3-azidomethylceph-3-em-4-carboxylic acid (2.55 g., 10 m.moles) was dissolved in acetone (50 ml.) and water (50 ml.) containing sodium hydrogen carbonate (2.1 g., 25 m.moles). The resulting pale yellow solution was treated with part (2.5 ml.) of a solution of 3-(2-chlorophenyl)-5-methylisoxazol-4-yl-acetyl chloride (2.33 g., 8.6 m.moles) in acetone (3 ml.). The light brown solution was stirred for 15 min. and then the remainder of the acid chloride solution was added. The mixture was stirred at room temperature for 1 hr. and then extracted into ethyl acetate (3×50 ml.). The aqueous layer was covered with ethyl acetate and acidified to pH 1.5 with concentrated hydrochloric acid. Some solid, insoluble in both layers was removed by centrifuging, the aqueous layer was further extracted into ethyl acetate, the combined extracts were washed with water, and evaporated to give a solid (1.63 g.). This product was boiled with ether (50 ml.) for 15 min.; the ether was decanted and the gummy solid was dissolved in acetone (20 ml.), filtered, and the filtrate treated with water (50 ml.) with warming. The clear solution deposited crystals at 5° overnight; these were collected and dried in vacuo over phosphorous pentoxide to give the title acid (0.32 g.), m.p. 154° (decomp.) $[\alpha]_D$+62°, $\lambda_{max.}$ 260 nm. ($\epsilon$ 8,700), (Found: C, 47.8, 48.0; H, 3.6, 3.6; Cl, 7.5; N, 16.3, 16.3, 16.4; S, 6.7. $C_{20}H_{17}ClN_6O_5S$, 0.5$H_2O$ requires C, 48.2; H, 3.6; Cl, 7.1; N, 16.9; S, 6.4 percent). Two further crops (0.24 and 0.037 g.) were obtained from the mother liquors and a fourth crop (0.4 g.) from the ether extract bringing the total yield to 20 percent.

EXAMPLE 11 a. 3-(2', 6'-Dichlorophenyl)-4-diazomethylcarbonyl-5-methylisoxazole 3-(2', 6'-Dichlorophenyl)-5-methylisoxazole-4-carbonyl chloride (6.57 g., 22.4 m.moles) in dry dioxan (25 ml.) was added to a stirred solution of diazomethane (62 m.moles) in ether (186 ml.) with cooling to between −10° and 0°. The cloudy yellow solution was allowed to warm to room temperature and stand overnight. The solvents were removed at <40° to give the diazoketone as a pale yellow crystalline solid (5.16 g., 78 percent), $\lambda_{max.}$ 286–287 nm (too insoluble in ethanol to get accurate absorbance figures), $\nu_{max.}$ ($CHBr_3$) 2,120 ($N_2$) and 1,618 cm.$^{-1}$ (CO—C=C—).

b. 3-(2', 6'-Dichlorophenyl)-5-methylisoxazol-4-yl-acetic acid

The diazoketone from (a) (5.16 g., 17.5 m.moles) was dissolved in warm dry ethanol (200 ml.). An aliquot (0.1 ml.) of this solution was diluted to 100 ml. with absolute ethanol and the ultraviolet spectra recorded ($\lambda_{max}$. 287 nm, optical density 1.00). The bulk of the solution was placed in a thermostat bath at 70° and treated with a portion Ca. 1 ml. of a suspension of freshly precipitated silver oxide (2.32 g.) in dry ethanol (10 ml.). The flask was swirled and after a few minutes evolution of nitrogen was observed. A further aliquot of silver oxide was added and the reaction mixture was left at 70° for 30 min. when gas evolution had stopped. A third portion of silver oxide suspension was then added with shaking. After a total time of 1 hr. an aliquot was diluted and submitted for an ultraviolet spectrum ($\lambda_{max}$. 286 nm, optical density 0.79). The procedure was repeated, additions of silver oxide suspension being added at 30 min. intervals. After 3 hr. a diluted aliquot showed an optical density of 0.22 at 280 nm; this decreased to 0.08 (note: during the last 1 hr. the reaction mixture was heated under reflux.) The cooled mixture was filtered through kieselguhr and evaporated at <40° to a dark yellow oil which was dissolved in ethyl acetate and washed successively with a saturated solution of sodium bicarbonate and water. The dry extract was evaporated to give the ethyl ester as a yellow viscous oil (4.6 g.),

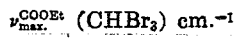

$\nu_{max.}^{COOEt}$ (CHBr$_3$) cm.$^{-1}$

The ethyl ester (4.6 g.) was dissolved in dry ethanol (50 ml.) and a solution of potassium hydroxide (2g.) in water (6 ml.) was added. The deep red solution was allowed to stand at room temperature for 1.5 hr.; a yellow solid was deposited on the sides of the flask during this time. The reaction mixture was evaporated at <30° and the red oil was shaken with water (100 ml.) and extracted into ether (3×50 ml.). Evaporation of these extracts gave a yellow oil (0.87 g.) which was not further examined. The red aqueous layer was covered with ethyl acetate and acidified with concentrated hydrochloric acid to pH 1.6. The layers were separated and the aqueous layer was further extracted with ethyl acetate (2×50 ml.). The combined extracts were washed with water, dried and evaporated to give a brown solid (3.07 g.). Crystallization from aqueous ethanol gave two crops of crystals (0.97 g., m.p. 172°–173° and 0.62 g., m.p. 168°–170°) and a residue as a pale yellow solid weighing 1.06 g. Total yield 63 percent. The first crop was recrystallized from aqueous acetone to give the title acid as yellow needles m.p. 170°, $\lambda_{max}$. 273–274 nm ($\epsilon$ 715) and inflections at 238 nm ($\epsilon$ 5,380) and 280 nm ($\epsilon$620), (Found: C, 50.2; H, 3.3; Cl, 24.8; N, 4.7. $C_{12}H_9Cl_2NO_3$ requires: C, 50.3; H, 3.2; Cl, 24.8; N, 4.9%).

c. The dichloroacid from (b) (1.9 g.) was heated under reflux with thionyl chloride (25 ml.) for 1.5 hr. and evaporated to give the crude acid chloride (2.2 g., 100 percent) as a brown gum. This material in acetone (3 ml.) was divided into two parts the larger of which (2.5 ml.) was added dropwise to a cooled (10°), stirred solution of 7-aminocephalosporanic acid (1.57 g., 5.8 m.moles) in water (50 ml.) containing sodium hydrogen carbonate (1.32 g., 15.7 m.moles). The mixture was stirred for 15 min. when the remainder of the acid chloride solution was added and stirring continued for 1.75 hr. at room temperature. The pH was adjusted to 7.0 with ethyl acetate (3×50 ml.). The aqueous layer under ethyl acetate (50 ml.) was acidified to pH 1.5 with 2N-hydrochloric acid and some 7-aminocephalosporanic acid (0.24 g.) was filtered off. The aqueous layer was further extracted into ethyl acetate and the extracts were combined, washed with water, dried and evaporated to give an orange solid (0.79 g.). This product (0.70 g.) in ethyl acetate (30 ml.) was treated with sodium ethyl hexanoate in butan-1ol (5 ml., 10 percent w/v. solution) to give a pale yellow gelatinous solid which was collected and dried to provide (0.46 g.), $[\alpha]_D$+71.5° (water) $\lambda_{inf}$. 260 nm ($\epsilon$ 8,500) (Found: C, 47.7, 47.3; H, 4.0, 3.7; N, 6.7, 6.4. $C_{22}H_{18}Cl_2NaN_3O_7S$, 0.5 EtOAc requires: C, 47.5; H, 3.7; N, 6.9%) of sodium 3-acetoxymethyl-7-[3'-(2''''-dichlorophenyl) -5'-methylisoxazol-4'-yl-acetamide]ceph-3-em-4-carboxylate.

EXAMPLE 12

3-Azidomethyl-7-[3'-(2''''-dichlorophenyl)-5'-methylisoxazol-4'-yl-acetamido]ceph-3-em-4-carboxylic acid 7-Amino-3-azidomethylceph-3-em-4-carboxylic acid (2.12 g., 8.3 m.moles) was acylated with crude acid chloride obtained from 3-(2',6'-dichlorophenyl)-5-methylisoxazol-4-yl-acetic acid (2.4 g., 8.3 m.moles) as described above. Workup resulted in recovery of the starting azide (0.39 g.) and an ethyl acetate soluble solid (1.98 g.) which could not be satisfactorily crystallized. The product was dissolved in ethyl acetate (200 ml.) and treated with sodium 2-ethyl hexanoate in butan-1ol (10 ml., 10 percent w./v.). No solid precipitated so the solution was slowly poured into ether (500 ml.), cooled at 5° for several hours and centrifuged to give the sodium salt of the title compound (0.59 g., 13 percent $\lambda_{max}$. 264 nm ($\epsilon$8,350), (Found: C, 42.5; H, 3.6; Cl, 12.2; N, 12.6; S, 5.8. $C_{20}H_{15}Cl_2NaN_6O_{bv}^{S, tH}{}_2$ O requires C, 42.6; H, 3.1; Cl, 12.6; N, 14.9; S, 5.7%) characterized by a single spot on chromatography.

EXAMPLE 13

3-Acetoxymethyl-7-(o-benzylmercapto-benzamido)-ceph-3-em-4-carboxylic acid

Thiosalicylic acid was benzylated and converted to its acid chloride (m.pt. 119°–121°) with thionyl chloride. o-Benzylmercaptobenzoyl chloride (3.0 g. 11.4 m.moles) was reacted with 3-acetoxymethyl-7-amino-ceph-3-em-4-carboxylic acid (3.0 g. 11.1 m.moles) in a similar manner to example 1 to give the title compound. Yield 4.1 g. (77.5 percent. $\lambda$ 262 nm max. $E_{1cm.}^{1\%}$=251. $R_f$ butanol system = 0.85., $R_f$ ethyl acetate system 0.56.

EXAMPLE 14

3-Acetoxy-7-(o-methylmercaptobenzamido)-ceph-3-em-4-carboxylic acid o-Methylmercaptobenzoic acid (2.25 g. 13.4 m.moles) was converted to its acid chloride with thionyl chloride. Reaction with 3-acetoxy-methyl-7-aminoceph-3-em-4-carboxylic acid (3.0 g. 11 m.moles under conditions outlined in example 1, gave the title compound Yield 4.0 g. (86.0 percent). $\lambda$ 258 nm max. $E_{1cm.}^{1\%}$=346. $R_f$ butanol system = 0.77, $R_f$ ethyl acetate system=0.18.

EXAMPLE 15 a 2-Carboxy-2-phenyl-1,3-dithiane[1]. A solution of 2-phenyl-1,3-dithiane[2] (19.63 g., 0.1 mole) in dry tetrahydrofuran (130 ml.) at −30° C. under nitrogen was stirred and treated with two equivalents of n-butyl-lithium in ether (100 ml.) over a period of 30 minutes. The mixture was stirred at −30° C. for a further 30 minutes then cooled to −70° C. and treated at this temperature with a rapid stream of dry, oxygen-free, carbon dioxide gas for 2 hour. The reaction mixture was allowed to warm to 0° C., then poured into ice-water (300 ml.), separated, and the aqueous phase washed with ether (100 ml.). The organic phase and ether washings were extracted with 3 percent -sodium hydrogen carbonate (100 ml.), and the combined aqueous portion acidified to pH 2.5 under ether (150 ml.). The aqueous portion was reextracted with ether (100 ml.), and the combined extract washed with water (100 ml.), dried, and concentrated in vacuo to give a white crystalline solid (19.5 g., 81 percent) which crystallized from benzene-ether(2 : 1) to give 2-carboxy-2-phenyl-1,3-dithiane as needles (16.5 g., 69 percent), m.p. 144°–147°, $\nu_{max}$.(nujol) 2,600 and 1,686 (—CO$_2$ H), 715 and 690 cm.$^{-1}$. (C$_6$ H$_5$ —). Found: C, 54.9; H, 5.1; S,26.8 C$_{11}$ H$_{12}$ O$_2$ S$_2$ requires C, 55.0 H, 5.0; S, 26.7 percent).

b. 2-Chlorocarbonyl -2-phenyl-1,3-diethiane

2-Carboxy-2-phenyl-1,3-dithiane (4.81 g., 20 m.moles), benzene (20 ml.) and thionyl chloride (2.9 ml., 40 m.moles)

were heated together under reflux for 1 hr. Volatile material was removed under reduced pressure, leaving a solid product which crystallized from light petroleum (b.p. 60°–80°) to provide 2 - chlorocarbonyl-2 -phenyl-1,3 -dithiane as pale-brown prisms (4.1 g., 79 percent), m.p. 87°–90°, $\nu_{max.}$(CHBr$_3$) 1,780 (—COCl), and 700 cm.$^{-1}$ (C$_6$H$_5$—). (Found: C 51.1; H, 4.15; Cl, 13.6; S, 24.4. C$_{11}$H$_{11}$ClOS$_2$ requires C, 51.0; H, 4.3; Cl, 13.7; S, 24.8 percent).

c. Sodium 3 -azidomethyl-7 -(2'-phenyl-1,3 -dithiane-2'-carboxamido) ceph-3 -em-4 -carboxylate.

7 -Amino-3 -azidomethylceph-3 -em-4 -carboxylic acid (2.55 g., 10 m.moles) was dissolved in solution of sodium hydrogen carbonate (2.1 g., 25 m.moles) in water (40 ml.), and acetone (30 ml.) was added. The stirred solution was cooled to 0°–5° C and treated with a solution of 2 -chlorocarbonyl-2-phenyl-1,3-dithiane (2.59 g., 10 m.moles in acetone (16 ml.) over a period of 2 min. The mixture was stirred at 0°–5° C for 15 minutes then a further quantity of the acid chloride (0.65 g., 2.5 m.moles) in acetone (4 ml.) was added. The reaction mixture was allowed to reach room temperature over 1 hour, filtered and concentrated in vacuo to remove the bulk of the acetone. The resulting solution was washed with ethyl acetate (2 ×50 ml.) and upon cooling the title compound was deposited as a white solid (3.1 g., 62 percent). Recrystallization from water afforded a purified product (1.8 g., 36 percent), $(\alpha)_D^{22}+67°$ (c 1.03; dimethyl sulfoxide), $\lambda_{max.}$ 260–261 nm, ($\epsilon$9,040 ), $\nu_{max.}$(nujol) 2,110 (—N$_3$), 1,760 ($\beta$-lactam), 1,680 and 1,500 (amide), 1,610 (CO$_2$), 750 and 693cm.$^{-1}$ (C$_6$H$_5$—). (Found: C, 45.65; H, 3.6; N, 13.35; Na, 4.2; S, 18.3. C$_{19}$H$_{18}$N$_5$NaO$_4$S$_3$ requires C, 45.7; H, 3.6; N, 14.05; Na, 4.6; S, 19.3 percent). R$_F$0.64, R$_{PAC}$4.57 (system A); R$_F$0.77, R$_{PAC}$ 1.10 (system B).

Acidification of the original aqueous filtrate to pH 2.0, followed by ethyl acetate extraction (1×100 ml., 2×50 ml.) gave, after washing the extract with water (50 ml.) drying, and evaporation in vacuo, the free acid of the title compound as a crude yellow foam (1.5 g., 31 percent).

EXAMPLE 16 a. 2-Ethoxycarbonyl-2-phenyl-1,3-dithiolane

A solution of ethylbenzoylformate (25.0 g., 0.15 moles) in a mixture of benzene (250 ml.) and 1,2-ethanedithiol (13.0 ml., 0.155 moles) containing p-toluenesulfonic acid (2.7 g., 0.015 moles) was heated under reflux in a Dean-Stark water separator for 18 hr. The bulk of the benzene was removed by distillation and the resulting solution poured into water (200 ml.), separated, then successively washed with saturated aqueous sodium carbonate (100 ml.), water (100 ml.), dried, and evaporated in vacuo to leave a white solid (27.7 g., 78 percent). This material crystallized from light petroleum (b.p. 60°–80°)-ether to furnish 2-ethoxycarbonyl-2-phenyl-1,3-dithiolane as prisms (16.7 g., 47 percent), m.p. 54°–58°, $\nu_{max.}$ (CS$_2$). 1,725 and 1,200 (ester), 725 and 688 cm.$^{-1}$(C$_6$H$_5$—). A further crystallization provided the analytical sample, m.p. 58°–58.5°. (Found: C, 56.6; H, 5.15; S, 24.8. C$_{12}$H$_{14}$O$_2$S$_2$ requires C, 56.55; H, 5.55; S, 25.2 percent).

b. 2-Carboxy-2-phenyl-1,3-dithiolane

A suspension of 2-ethoxycarbonyl-2-phenyl-1,3-dithiolane (16.0 g., 63 m.moles) in 0.5 N-aqueous-alcoholic potassium hydroxide solution (1:1) (200 ml.) under nitrogen was stirred at room temperature for 1 hr. and then under reflux for a further 1 hr. The bulk of the ethanol was removed from the resulting solution in vacuo and the aqueous residue diluted with water (100 ml.) and washed with ether (2×50 ml.). The aqueous solution was acidified to pH 3.0 H, under ether (100 28.3 percent). the aqueous portion was reextracted with ether (2×50 ml.). Evaporation of the dried extract in vacuo gave 2-carboxy-2-phenyl-1,3-dithiolane which crystallized from benzene-ether in needles (11.8 g., 83 percent), m.p. 164°–165°, $\nu_{max.}$ (nujol) 2,600 and 1,700 (—CO$_2$H), 722 and 698 cm.$^{-1}$ (C$_6$H$_5$—). Found: C, 53.0; H, 4.3; S, 27.8. C$_{10}$H$_{10}$O$_2$S$_2$ requires C, 53.1; H, 4.45; S, 28.3 percent).

c. 2-Chlorocarbonyl-2-phenyl-1,3-dithiolane

2-Carboxy-2-phenyl-1,3-dithiolane (4.52 g., 20 m.moles), benzene (20 ml.) and thionyl chloride (2.9 ml., 40 m.moles) were heated together under reflux for 1 hr. Volatile material was removed under reduced pressure leaving a pink solid which crystallized from light petroleum (b.p. 60°–80°)-ether to provide 2-chlorocarbonyl-2-phenyl -1,3-dithiolane as white needles (3.6 g., 73.5 percent), m.p. 57°–60°, $\nu_{max.}$ (nujol) 1,790 and 1,775 (—COCl) and 710 cm.$^{-1}$ (C$_6$H$_5$—). (Found: C, 49.0; H, 3.6; Cl, 14.0; S, 26.1. C$_{10}$H$_9$ClO$_2$S requires C, 49.1; H, 3.7; Cl, 14.5; S, 26.2 percent).

d. Sodium 3-azidomethyl-7-(2'-phenyl-1', 3'-dithiolane -2'-carboxamido) ceph-3-em-4 -carboxylate 7-Amino-3-azidomethyl-3-em-4-carboxylic acid (2.55 g., 10 m.moles) was dissolved in a solution of sodium hydrogen carbonate (2.1 g., 25 m.moles) in water (40 ml.), and acetone (30 ml.) was added. To the stirred solution at 0°–5° C. was added a solution of 2-chlorocarbonyl-2-phenyl-1,3-dithiolane (2.45 g., 10 m.moles) in acetone (16 ml.) over a period of 2 min. Immediately precipitation occurred. The mixture was stirred at 0°–5° C. for 15 min., then a further quantity of the acid chloride (0.61 g., 2.5 m.moles) in acetone (4 ml.) was added. The reaction mixture was allowed to reach room temperature over 1 hr. and the solid product was collected (3.4 g., 70 percent). Concentration of the filtrate provided a second crop of similar material (0.75 g., 15 percent). Recrystallization of the combined crops from water provided the title compound as a white solid (2.74 g., 56.5 percent), ($\alpha$) D$^{22}$+72.5° (c 1.0; dimethyl sulfoxide), $\lambda_{max.}$ 261 nm ($\epsilon$ 9,550), $\nu_{max.}$ (nujol) 2,108 (—N$_3$), 1,754 ($\beta$-lactam), 1,675 and 1,502 (amide) and 1,604 cm.$^{-1}$ (CO$_2$—). (Found: C, 43.6; H, 3.5; N, 13.75; Na, 4.5; S, 19.6. C$_{18}$H$_{16}$N$_5$NaO$_4$S$_3$ requires C, 44.5; H, 3.3; N, 14.4; Na, 4.7; S, 19.8 percent). R$_F$ 0.54; R$_{PAC}$ 3.85 (system A); R$_F$ 0.77; R$_{PAC}$ 1.10 (system B).

EXAMPLE 17 a. 2-Ethoxycarbonyl-6,7-dimethyl-2-phenylbenz(e)-1,3-dithiepen

A solution of ethyl benzoylformate (4.45 g., 25 m.moles) in benzene (75 ml.) containing 1,2-dimethyl-4,5-di(mercaptomethyl) benzene[3] (4.95 g., 25 m.moles) and p-toluenesulfonic acid (0.47 g., 2.5 m.moles) was heated under reflux in a Dean-Stark water separator for 17 hr. The cooled solution was poured into water (75 ml.) and the organic layer was separated, washed with saturated aqueous sodium hydrogen carbonate (50 ml.), and dried. Removal of the solvent in vacuo afforded a white solid which crystallized from light petroleum-ether to provide the title ester (3.78 g., 85 percent) as prisms m.p. 116°–116.5°, $\nu_{max.}$ (CS$_2$) 1,720 and 1,208 (—CO$_2$C$_2$H$_5$), 722 and 688 cm.$^{-1}$. (C$_6$H$_5$—). (Found: C, 66.3; H, 6.2; S, 17.8. C$_{20}$H$_{22}$O$_2$S$_2$ requires C, 67.0; H, 6.2; S, 17.9 percent).

b. 2-Carboxy-6,7-dimethyl-2-phenylbenz(e)-1,3-dithiepen

A suspension of 2-ethoxycarbonyl-6,7-dimethyl-2-phenyl-benz(e)-1,3-dithiepen (3.7 g., 10.3 m.moles) in 0.5 N-aqueous alcoholic potassium hydroxide solution (1:1) (50 ml.) under nitrogen, was brought gently to reflux. After 30 min. the reaction mixture, which had turned a deep blue color, was cooled to 0°–5°, whereupon the crude sodium salt of the title compound was deposited as a pale blue crystalline solid (3.5 g., 99 percent). This material was suspended in water (200 ml.), washed with chloroform (2×100 ml.), and acidified to pH 2.5 under ether (100 ml.). The aqueous portion was reextracted with ether (2×50 ml.) and the combined extract was washed with water (50 ml.), dried and concentrated in vacuo leaving a white solid (2.6 g., 77 percent) which crystallized from benzene-ether to give the title acid as prisms (2.29 g., 67 percent), m.p. 192.5°–194°. A portion of this material was recrystallized to give an analytical sample, m.p. 196°–197°, $\nu_{max.}$ (nujol) 1,685 cm.$^{-1}$ (—CO$_2$H). (Found: C, 64.35; H, 5.5; S, 19.0. C$_{18}$H$_{18}$O$_2$S$_2$ requires C, 65.4; H, 5.5; S, 19.4 percent).

c. 2-Chlorocarbonyl-6,7-dimethyl-2-phenylbenz(e)-1,3-dithiepen

2-Carboxy-6,7-dimethyl-2-phenyl-benz(e)-1,3-dithiepen (1.42 g., 4.3 m.moles), benzene (15 ml.) and thionyl chloride (0.72 ml., 10 m.moles) were heated together under reflux for 1 hr. The benzene and excess thionyl chloride were removed in vacuo leaving a pale brown solid which crystallized from light petroleum (b.p. 60°–80°)-benzene to provide the title acid chloride as white plates (1.12 g., 74.5 percent), m.p. 167°–169°. Recrystallization furnished an analytical sample, m.p. 170°–172°, $\nu_{max}$. (nujol) 1,785 (—COCl) and 702 cm.$^{-1}$ ($C_6H_5$—). (Found: C, 62.25; H, 5.0; Cl, 10.2; S, 17.8. $C_{18}H_{17}ClSO_2$ requires C, 61.95; H, 4.9; Cl, 10.2; S, 18.4).

d. Sodium 3-azidomethyl-7-(6', 7'-dimethyl-2'-phenylbenz(e)-1', 3'-dithiepen-2'-carboxamido)ceph-3-em-4-carboxylate 7-Amino-3-azidomethylceph-3-em-4-carboxylic acid (0.66 g., 2.58 m.moles) was dissolved in a solution of sodium hydrogen carbonate (0.54 g., 6.44 m.moles) in water (10 ml.) and acetone (10 ml.) was added. To the stirred solution at 0°–5° was added a solution of 2-chlorocarbonyl-6,7-dimethyl-2-phenylbenz(e)-1,3-dithiepen (0.90 g., 2.58 m.moles) in acetone (25 ml.) over a period of 2 min. The mixture was stirred at 0°–5° C. for 15 min., then a further quantity of the acid chloride (0.20 g., 0.6 m.moles) in acetone (10 ml.) was added. The reaction mixture was allowed to reach room temperature over one-half hr. and then concentrated under reduced pressure, filtered, diluted with water (300 ml.) and washed with ethyl acetate (100 ml.). The aqueous portion was acidified to pH 2.5 under ethyl acetate (100 ml.), separated and reextracted with further ethyl acetate (2×50 ml.). The organic extract was washed with water (50 ml.), dried, and the solvent evaporated off in vacuo leaving a yellow foam (0.94 g., 64 percent). This foam was dissolved in acetone (5 ml.) and treated with 10 percent sodium 2-ethylhexanoate in acetone (3 ml.). The title compound was precipitated from this solution by the addition of excess ether as an off-white solid (0.75 g., 49 percent), $(\alpha)D^{20}+59.4°$ (c 1.03; water) $\lambda_{max}$. 260 nm. ($\epsilon$9,200), $\nu_{max}$. (nujol) 3,350, 1,682 and 1,500 (amide), 2,112 (azide), 1,765 and 1,755 ($\beta$-lactam) and 1,610 cm.$^{-1}$ ($CO_2$—) (Found: C, 52.7; H, 4.3; N, 9.8; S, 15.6. $C_{26}H_{24}N_5NaO_4S_3$ requires C, 52.95; H, 4.1; N, 11.9; S, 16.3 percent). $R_F$ 0.65, $R_{PAC}$ 5.91 (system A).

EXAMPLE 18 a. DL-2-Phenyl-2-acetoxypropionic acid

DL-2-Phenylacetic acid (9.24 g., 0.055 mole) and acetyl chloride (18.5 ml.) were heated together at 60°–80° for 1½ hr. Volatile material was removed in vacuo at less than 80° and the residue was stored for 2 days in a refrigerator with water (150 ml.). The colorless semisolid was extracted with ether (2×250 ml., 1×100 ml.), the ether extracts were washed with water (3×50 ml.), dried over magnesium sulfate, and evaporated in vacuo. The semisolid residue (10.18 g.) was warmed with water (50 ml.), cooled to room temperature, and stirred vigorously for several hours; after being refrigerated for 1½ hours, the crude crystalline product (8.92 g.) was collected and dried in vacuo. A portion (1.03 g.) was crystallized from di-isopropyl ether (3 ml.) to give colorless needles (159 mg.) showing anhydride bands in the infrared spectrum; a second crystalline crop (384 mg.), free from anhydride bands in the infrared region, was obtained on concentration of the liquors. Recrystallization of the second crop gave DL-2-phenyl-2-acetoxypropionic acid, colorless needle-clusters from cyclohexane (328 mg.), m.p. 106°–108°, $\nu_{max}$. (nujol) 2,650, 2,540, 1,710 ($CO_2H$), 1,740 and 1,222 (acetate) cm.$^{-1}$; $\tau$(deuterium oxide+sodium bicarbonate) 7.82 (CO·CH$_3$) and 8.11

(—>C—CH$_3$)

p.p.m. (Found: C, 63.6; H, 6.0. $C_{11}H_{12}O_4$ requires C, 63.45; H, 5.8%). Recrystallization of the first crop from cyclohexane gave colorless leaflets (106 mg.) of DL-2-phenyl-2-acetoxypropionic anhydride, m.p. 125°–127°$\nu_{max}$. (carbon disulfide) 1,828 and 1,753 (anhydride), 1,745 and 1,039 (acetate) and 689 (phenyl) cm.$^{-1}$; $\tau$(deuteriochloroform) singlets at 2.62 (phenyl), 8.32

(—>C—CH$_3$)

and 8.16 (CO·CH$_3$) (Found: C, 66.6, 66.0; H, 5.6, 5.7. $C_{22}H_{22}O_7$ requires C, 66.3; H, 5.6%).

b. DL-2-Phenyl-2-acetoxypropionyl chloride

A solution of DL-2-phenyl-2-acetoxypropionic acid (7.83 g., 0.0376 mole) in dry benzene (50 ml.) was treated with thionyl chloride (7.8 ml.) and the mixture was refluxed for 1¼ hr. Volatile material was removed under reduced under pressure and the product was distilled to give DL-2-phenyl-2-acetoxypropionyl chloride as a colorless oil (4.93 g., 58%), b.p. 114°/0.9 mm., $n^{22}D$ 1.5138; $\lambda_{max}$. (carbon disulfide) 1,792 (COCl), 1,760 and 1,220 (acetate) cm.$^{-1}$; $\tau$(deuteriochloroform) 7.72 (CO·CH$_3$) and 8.00

(—>C—CH$_3$)

p.p.m.

c. 3-Azidomethyl-7-(DL-2-phenyl-2-acetoxypropionamido) ceph-3-em-4-carboxylic acid A suspension of 3-azidomethyl-7-aminoceph-3-em-4-carboxylic acid (5.00 g., 0.0196 mole) in boiling ethyl acetate (200 ml.) was treated with DL-2-phenyl-2-acetoxypropionyl chloride (4.49 g., 0.198 mole), and the mixture was refluxed for 1 hour. Solid material (3.4 g.) was removed by filtration of the cooled reaction mixture, and the filtrate was treated with aniline (5.36 ml.) and kept for 1 hr. The mixture was extracted with 3 percent sodium hydrogen carbonate solution (3×100 ml.), the combined aqueous extracts were washed with ethyl acetate (3×100 ml.), and then acidified to pH 1.5 with stirring under ethyl acetate (100 ml.), using 2N-hydrochloric acid. The aqueous phase was then further extracted with ethyl acetate (2×100 ml.), the combined organic extracts were washed with water (2×50 ml.), stirred with charcoal, dried over magnesium sulfate, and evaporated in vacuo at room temperature to give a yellow foam (5.17 g.). A portion (3.32 g.) of this acidic fraction was dissolved in chloroform (15 ml.) and the solution was poured into petrol (b.p. 40°–60°) (650 ml.) and the mixture was stirred; the precipitated solid (2.60 g.) was collected, washed with petrol and dried in vacuo. This material was reprecipitated from chloroform (15 ml.) with di-isopropyl ether (75 ml.) to give an amorphous pale yellow solid (756 mg.), the title cephalosporin derivative contaminated with a little DL-2-phenyl-2-acetoxypropionic acid and di-isopropyl ether, revealed by paper chromatography and proton-magnetic resonance spectroscopy ($\tau$8.84 and 8.94 p.p.m. respectively. $[\alpha]_D+43°$ (c 1.0, dioxan), $\lambda_{max}$. 261 nm. ($\epsilon$ 7,850), $\nu_{max}$. (nujol) 2,110(azide) 1,772 ($\beta$-lactam) 1,730 and 1,220 (acetate), 1,690 and 1,520 (amide) cm.$^{-1}$; $\tau$(deuterium oxide+sodium bicarbonate) singlets at 7.78 (CO·CH$_3$), 8.05

(—>C—CH$_3$)

, broad signal at ca. 4.47 ($\beta$-lactam, C-7), two doublets centered at 5.02 and 5.07 (J 4 c/s) ($\beta$-lactam, C-6, in each diastereoisomer) p.p.m. (Found: C, 52.4; H, 4.8; N, 13.95; S, 6.5. $C_{19}H_{19}N_5O_6S$.½Pr$_2$O requires C, 53.1; H, 5.3; N, 14.1; S, 6.45%). $R_{PAC}$ 3.09 (system A).

EXAMPLE 19

Sodium 3-acetoxymethyl-7-(2,4,6-trimethyl-benzamido)-ceph-3-em-4-carboxylate

7-Aminocephalosporanic acid (1.5 g.) was suspended in a mixture of hexamethyldisilazane (2.2 g.) and chloroform (15 ml., dried by passing through basic, grade 1, WOELM Alumina) and the mixture refluxed for 45 min. The chloroform and the excess of hexamethyldisilazane were removed in vacuo, leaving a light brown gum. This material was dissolved in ethyl acetate (45 ml., dried by passing through neutral, grade 1, WOELM Alumina) and 2,4,6-trimethylbenzoyl chloride (1.0 g.) was added. The solution was boiled under reflux for 1 hr., cooled and treated with aniline to neutralize excess acid chloride. After 1 hr., the mixture was extracted with 3 percent sodium bicarbonate solution. This extract was washed with ethyl acetate and then acidified to pH 1.5 with concentrated hydrochloric acid, in the presence of ethyl acetate. The aqueous layer was separated and extracted with ethyl acetate. The combined ethyl acetate extracts were washed with water and then dried over magnesium sulfate The solvent was removed in vacuo, and the resulting yellow froth dissolved in acetone and treated with 10 percent sodium 2-ethylhexanoate in acetone. After standing for 1 hr. at room temperature, the sodium salt was filtered off and washed with acetone and ether. The buff solid was dried in vacuo over phosphorous pentoxide (yield 1.31 g., 54%). This material crystallized from aqueous acetone as colorless needles, $[\alpha]D^{20}+59$ (C, 1.0; $H_2O$), $\lambda_{max}$. 260 m$\mu$ ($\epsilon$9,900), $\nu_{max}$. (Nujol) 1,765 ($\beta$-lactam), 1,725 and 1,250 (—OCOCH$_3$), 1,640 and 1,530 (—CONH—), 1,622 (COO') cm.$^{-1}$ (Found: C, 54.3; H, 4.8; N, 6.3; S, 7.1. $C_{20}H_{21}N_2NaO_6S$ requires C, 54.5; H, 4.8; N, 6.4; S, 7.3%).

EXAMPLE 20

Sodium 3-azidomethyl-7-(2', 4', 6'-trimethyl-benzamido)-ceph-3-em-4-carboxylate

By using the general method of example 19, but with 3-azidomethyl-7-aminoceph-3-em-4-oic acid (2 g., 7.9 m.moles), hexamethyldisilazane (2 g., 12.4 m.moles) and 2,4,6-trimethyl-benzoyl chloride (1.5 g., 8.2 m.moles), sodium 3-azidomethyl-7-(2', 4', 6'-trimethylbenzamido)-ceph-3-em-4-carboxylate was obtained as a buff solid (1.96 g., 59%). This material crystallized from aqueous acetone as colorless needles, $[\alpha]D^{20}+67.4°$, (C, 1; $H_2O$), $\lambda_{max}$. 260 m$\mu$ ($\epsilon$ 9,400), $\nu_{max}$. (Nujol) 2,120 (—N$_3$), 1,770 ($\beta$-lactam), 1,650 and 1,522 (—CONH—), 1,620 (COO') cm.$^{-1}$ (Found: C, 51.5; H, 4.2; N, 16.8; S, 7.7. $C_{18}H_{18}N_5NaO_4S$ requires C, 51.1; H, 4.3; N, 16.6; S, 7.6%).

EXAMPLE 21

Sodium 3-acetoxymethyl-7-(2'chlorobenzamido)-ceph-3-em-4-carboxylate

By using the general method of example 19, 7-aminocephalosporanic acid (3.5 g., 12.8 m.moles), hexamethyldisilazane (5.2 g., 32 m.moles) and 2-chlorobenzoyl chloride [from 2-chlorobenioic acid (2.1 g., 13.4 m.moles)] gave sodium 3-acetoxymethyl-7-(2'-chlorobenzamido)-ceph-3-em-4-carboxylate as a buff solid (4.76 g., 85%). This material crystallized from aqueous acetone as colorless needles, $[\alpha]D^{20}+86$ (C, 1; $H_2O$), $\lambda_{max}$. 260 m$\mu$ ($\epsilon$ 9,900), $\nu_{max}$. (Nujol) 3,260 (—NH—), 1,760 ($\beta$-lactam), 1,738 and 1,750 (—OCOCH$_3$), 1,660 and 1,538 (—CONH—), 1,630 (COO) cm.$^{-1}$ (Found: C, 46.9; H, 3,2; N, 6.5; S, 7.3. $C_{17}H_{14}ClN_2NaO_6S$ requires: C, 47.2; H, 3.3; N, 6.5; S, 7.4%).

EXAMPLE 22

Sodium 3-acetoxymethyl-(2', 4', 6'-trimethoxybeniamido)-ceph-3-em-4-carboxylate

By using the general method of example 19, 7-aminocephalosporanic acid (2.3 g., 8.5 m.moles), hexamethyldisilazane (4.8 g., 30 m.moles) and 2,4,6-trimethoxy benzoyl chloride [from 2,4,6-trimethoxybenzoic acid (2g., 8.7 m.moles)] gave sodium 3-acetoxymethyl-7-(2', 4', 6'-trimethoxybenzamido)-ceph-3-em-4-carboxylate as a brown solid (2.4 g., 58%). After successive purification by passage through an alumina column, by charcoaling in ethyl acetate and by precipitation from a solution in dimethylformamide, this material had $[\alpha]D^{20}+43°$ (C, 1; $H_2O$), $\lambda_{max}$. 258 m$\mu$ ($\epsilon$ 12,800), $\nu_{max}$. (Nujol) 1,760 ($\lambda$-lactam), 1,730 and 1,230 (—OCOCH$_3$), 1,660 and 1,510 (—CONH—), 1,605 (COO) cm.$^{-1}$ (Found: C, 49.1; H, 4.0; N, 5.5; S, 6.2. $C_{20}H_{21}N_3NaO_9S$ requires C, 49.2; H, 4.3; N, 5.7; S, 6.6%).

EXAMPLE 23

7-Bis(2-thienyl)acetamidocephalosporanic Acid

Bis(2-thienyl)acetic acid (4.0 g.)(m.p. 77°) was refluxed for 15 min. with thionyl chloride (2.2 ml.). The deep-blue solution was evaporated and treated with 7-aminocephalosporanic acid (5.7 g.) in refluxing ethyl acetate for 1 hr. The cooled mixture was filtered and treated with aniline (5 ml.). After 10 min. the crimson mixture was extracted with 3 percent sodium hydrogen carbonate, and the product was segregated into ethyl acetate. The title compound (3.56 g.) separated from light petroleum. The sodium salt separated from methanol-ether as crystals, m.p. 235° (decomp), $[\alpha]_D+83°$ (C 1.38, $H_2O$), $\lambda\lambda_{max}$. 238 nm. ($\epsilon$ 21,850) and 260 nm. ($\epsilon$ 10,600) in 0.1 M-phosphate buffer at pH 6), $\nu_{max}$. (Nujol) 1,762 azetidinone), and 1,740 and 1,230 cm$^{-1}$ (acetate) (Found: C, 47.2; H, 3.7; N, 5.3; S, 19.1 $C_{20}H_{17}N_2NaO_6S_3$ ½$H_2O$ requires C, 47.1; H, 3.6; N, 5.5; S, 18.9%).

EXAMPLE 24

7-DL-$\alpha$-Chlorophenylacetylcephalosporanic Acid

This compound was made similarly to the foregoing in 65 percent yield from 7-aminocephalosporanic acid (5.0 g.). It had these properties: $[\alpha]_D81°$ (c 1, dioxan), $\lambda_{max}$ 260 nm. ($\epsilon$ 8,730) (in 0.1 M-phosphate buffer at pH 6) (Found: C, 48.6; H, 4.4; CL, 8.3; N, 6.2; S, 7.2. $C_{18}H_{17}ClO_6N_2S$ requires C, 48.8; H, 4.3; CL, 8.0; N, 6.3; S, 7.2%).

We claim:
1. An antibiotic composition comprising from 5 to 95 parts be weight of (A) a broad spectrum cephalosporin antibiotic subject to degradation by a $\beta$-lactamase produced by Proteus morgani and from 95 to 5 parts be weight of (B) a compound of the formula

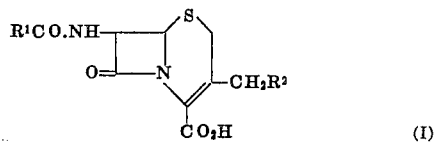

or a salt thereof with nontoxic cations, wherein $R^1$ is a group selected from the group consisting of (i) a phenyl group containing at least one substituent in an ortho position selected from the group consisting of lower alkyl, lower phenalkyl, lower alkylthio, lower phenalkylthio, lower alkoxy, chloro, bromo and iodo, (ii) 3-aryl-5-methyl-isoxazol-4-yl wherein aryl is a member selected from the group consisting of phenyl and phenyl substituted by at least one member selected from the group consisting of chloro and bromo, (iii) 1,1-disubstituted phenalkyl of the formula

wherein $R^5$ is a phenyl group, and $R^6$ and $R^7$ are each a group selected from the group consisting of lower alkyl, lower alkoxy, lower alkylthio, lower alkanoyloxy, amino, hydroxy and together with the carbon atom to which they are attached a group of the formula

wherein Z is a member selected from the group consisting of —(CH$_2$)$_n$— wherein n is an integer from 2 to 4 and a group of the formula

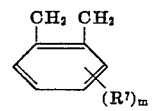

3,624,225

23 wherein $R^7$ is as defined above other than the group of the formula

and $m$ is 0 or an integer up to 2, (iv) a 3-aryl-5-methyl-isoxazol-4-ylmethyl group wherein aryl is a member selected from the group consisting of phenyl and phenyl substituted by at least one member selected from the group consisting of chloro and bromo, (v) a 1-bromobutyl group (vi) a 1-chloro-1-phenyl-methyl group, (vii) a thienyl group, (viii) a pyridyl group, (ix) a bis-(thienyl) methyl group and (x) an α-naphthyl group, and $R^2$ is a group selected from the group consisting of the acetate and azide.

2. An antibiotic composition as claimed in claim 1 wherein the cephalosporin antibiotic (A) is a compound of the formula

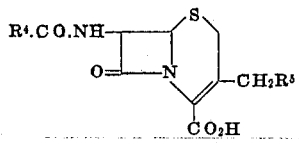

wherein $R^4$ is a group selected from the group consisting of 2-thienylmethyl and D-α-amino-α-phenylmethyl groups and $R^5$ is selected from the group consisting of acetate and, in betaine form with the adjacent carboxyl, $Py^+$ where Py is a group selected from the group consisting of N-pyridyl and N-pyridyl substituted by a member selected from the group consisting of carbamoyl, lower alkyl, hydroxy, hydroxymethyl, carboxy, lower alkylcarbamoyl and cyano.

3. An antibiotic composition as claimed in claim 2 wherein the cephalosporin antibiotic (A) is a compound of the formula:

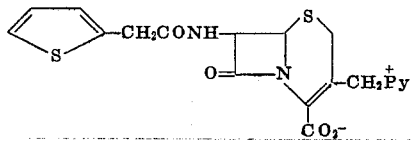

where Py is a group selected from the group consisting of N-pyridyl and N-pyridyl substituted by a member selected from the group consisting of carbamoyl, lower alkyl, hydroxy, hydroxymethyl, carboxy, lower alkylcarbamoyl and cyano.

4. An antibiotic composition as claimed in claim 2 wherein the cephalosporin antibiotic (A) is cephaloridine.

5. An antibiotic composition as claimed in claim 2 wherein the cephalosporin antibiotic (A) is cephalothin.

6. An antibiotic composition as claimed in claim 2 wherein the cephalosporin antibiotic (A) is cephaloglycin.

7. An antibiotic composition as claimed in claim 1 wherein the group $R^1$ in the compound of formula I is a phenyl group containing at least one substituent in an ortho position selected from the group consisting of lower alkyl, lower phenalkyl, lower alkylthio, lower phenalkylthio, lower alkoxy, chloro, bromo and iodo.

8. An antibiotic composition as claimed in claim 7 wherein the group $R^1$ in the compounds of formula I has the structure:

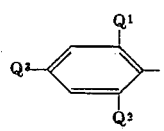

where $Q^1$ and $Q^2$ are each radicals selected from the group consisting of lower alkyl, lower alkoxy chloro, bromo and iodo

24 and $Q^3$ is selected from the group consisting of lower alkyl, lower alkoxy, chloro, bromo, iodo and hydrogen.

9. An antibiotic composition as claimed in claim 8 wherein the group $R^1$ in the compound of formula I is o,o'-dichlorophenyl.

10. An antibiotic composition as claimed in claim 8 wherein the group $R^1$ in the compound of formula I is o,o'-dimethoxyphenyl.

11. An antibiotic composition as claimed in claim 8 wherein the group $R^1$ in the compound of formula I is o,o'-dimethylphenyl.

12. An antibiotic composition as claimed in claim 1 wherein the group $R^1$ in the compound of formula I is a group selected from the group consisting of a 3-o-chlorophenyl-5-methyl-isoxazol-4-yl and a 3o,o'-dichlorophenyl-5-methyl-isoxazol-4-yl group.

13. An antibiotic composition as claimed in claim 1 wherein the group $R^1$ in the compound of formula I is a group of the formula

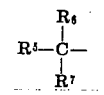

where $R^5$ is a phenyl group and $R^6$ and $R^7$ are each groups selected from the group consisting of lower alkyl, lower alkoxy, lower alkylthio, lower alkanoyloxy, amino, hydroxy and together with the carbon atom to which they are attached a group of the formula

wherein Z is a member selected from the group consisting of $-(CH_2)_n-$ wherein $n$ is an integer from 2 to 4 and a group of the formula

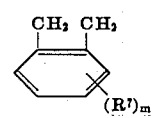

wherein $R^7$ is as defined above other than the group of the formula

and $m$ is 0 or an integer up to 2.

14. An antibiotic composition as claimed in claim 1 wherein the group $R^1$ in the compound of formula I is a group of the formula

where Ar is a phenyl group and Z is $-(CH_2)_n-$ wherein $n$ is an integer from 2 to 4.

15. An antibiotic composition as claimed in claim 1 where the group $R^1$ in the compound of formula I is a group of the formula

where Ar is a phenyl group and wherein Z is the group

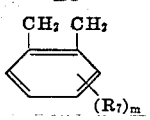

where $m$ is 0 or an integer up to 2 and $R_7$ is a lower alkyl group.

16. An antibiotic composition as claimed in claim 1 comprising a mixture of (A) cephaloridine and (B) 3-acetoxymethyl-7-(2'6'-dichlorobenzamido)-ceph-3-em-4-carboxylic acid.

17. An antibiotic composition as claimed in claim 16 but wherein compound (B) is present as the sodium or potassium salt thereof.

18. An antibiotic composition as claimed in claim 1 comprising a mixture of (A) cephaloridine and (B) 3-acetoxymethyl-7-(2',4',6'3-em-4-carboxylic acid.

19. An antibiotic composition as claimed in claim 18 wherein compound (B) is present as the sodium or potassium salt thereof.

20. An antibiotic composition as claimed in claim 1 comprising a mixture of (A) cephaloridine and (B) 3-acetoxymethyl-7-(2',6'-dimethoxybenzamido)-ceph-3-em-4-carboxylic acid.

21. An antibiotic composition as claimed in claim 20 but wherein compound (B) is present as the sodium or potassium salt thereof.

22. An antibiotic composition as claimed in claim 1 comprising a mixture of (A) cephaloridine and (B) 7-[3'-(2''-chlorophenyl)-5'-methyl-isoxazole-4'-carbonamido-]ceph-3-em-4-carboxylic acid.

23. A composition as claimed in claim 22 but wherein compound (B) is present as the sodium or potassium salt thereof.

24. An antibiotic composition as claimed in claim 1 wherein compounds (A) and (B) are present in a weight ratio of from about 80:20 to about 20:80 respectively.

25. An antibiotic composition as claimed in claim 1 wherein compounds (A) and (B) are present in a weight ratio of from about 2:1 to about 1:2 respectively.

26. An antibiotic composition as claimed in claim 1 wherein compounds (A) and (B) are present in a weight ratio of about 1:1 respectively.

27. An antibiotic composition as claimed in claim 7 wherein the group $R^1$ in the compound of formula I is a group selected from the group consisting of 3-phenyl-5-methyl-isoxazol-4-yl, 3-chlorophenyl-5-methyl-isoxazol-4-yl, 3-bromophenyl-5-methyl-isoxazol-4-yl, and 3-iodophenyl-5-methyl-isoxazol-4-yl.

28. A method of conducting antibiotic therapy comprising administering to the host an effective but nontoxic amount of a composition comprising from 5 to 95 parts by weight of (A) a broad spectrum cephalosporin antibiotic which is susceptible to degradation by β-lactamase produced by Proteus morgani and from 95 to 5 parts by weight of (B) a second cephalosporin antibiotic resistant to degradation by said β-lactamase and selected to protect said first-mentioned antibiotic against said β-lactamase, having the formula

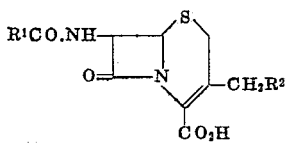

or a salt thereof with nontoxic cations, wherein $R^1$ is a group selected from the group consisting of (i) a phenyl group containing at least one substituent in an ortho position selected from the group consisting of lower alkyl, lower phenalkyl, lower alkylthio, lower phenalkylthio, lower alkoxy, chloro, bromo and iodo, (ii) 3-aryl-5-methyl-isoxazol-4-yl wherein aryl is a member selected from the group consisting of phenyl and phenyl substituted by at least one member selected from the group consisting of chloro and bromo, (iii) 1,1-disubstituted phenalkyl of the formula

wherein $R^5$ is a phenyl group, and $R^6$ and $R^7$ are each a group selected from the group consisting of lower alkyl, lower alkoxy, lower alkylthio, lower alkanoyloxy, amino, hydroxy and together with the carbon atom to which they are attached a group of the formula

wherein Z is a member selected from the group consisting of $—(CH_2)_n—$ wherein $n$ is an integer from 2 to 4 and a group of the formula

wherein $R^7$ is as defined above other than the group of the formula

and $m$ is 0 or an integer up to 2, (iv) a 3-aryl-5-methyl-isoxazol-4-ylmethyl group wherein aryl is a member selected from the group consisting of phenyl and phenyl substituted by at least one member selected from the group consisting of chloro and bromo, (v) a 1-bromobutyl group, (vi) a 1-chloro-1-phenyl-methyl group, (vii) a thienyl group, (viii) a pyridyl group, (ix) a bis-(thienyl) methyl group and (x) an α-naphthyl group, and $R^2$ is a group selected from the group consisting of the acetate and azide.

* * * * *